(12) United States Patent
Yasuda

(10) Patent No.: US 8,362,137 B2
(45) Date of Patent: Jan. 29, 2013

(54) PIGMENT DISPERSION AND INK COMPOSITION USING THE SAME

(75) Inventor: Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 50 days.

(21) Appl. No.: 12/884,240

(22) Filed: Sep. 17, 2010

(65) Prior Publication Data

US 2011/0077319 A1 Mar. 31, 2011

(30) Foreign Application Priority Data

Sep. 29, 2009 (JP) ................................. 2009-225191

(51) Int. Cl.
*C09D 11/10* (2006.01)
(52) U.S. Cl. ......... 524/505; 524/548; 524/560; 523/160
(58) Field of Classification Search .................. 524/505, 524/548; 523/160
See application file for complete search history.

(56) References Cited

U.S. PATENT DOCUMENTS

| | | | |
|---|---|---|---|
| 2007/0004823 A1 * | 1/2007 | Tsujihata | 523/160 |
| 2009/0082487 A1 * | 3/2009 | Kanda | 522/174 |
| 2009/0085017 A1 * | 4/2009 | Nemoto | 252/586 |

FOREIGN PATENT DOCUMENTS

| | | |
|---|---|---|
| EP | 1739141 A1 | 1/2007 |
| EP | 1975211 A1 | 10/2008 |
| EP | 2100925 A2 | 9/2009 |
| JP | 2003-026950 A | 1/2003 |
| JP | 2003-119414 A | 4/2003 |
| JP | 2003-321628 A | 11/2003 |
| JP | 2004-018656 A | 1/2004 |
| JP | 2004-131589 A | 4/2004 |
| JP | 3590382 B | 11/2004 |
| JP | 2007-009117 A | 1/2007 |
| JP | 2007-112932 A | 5/2007 |
| JP | 2008-056806 A | 3/2008 |
| WO | 2007/006639 A2 | 1/2007 |

OTHER PUBLICATIONS

Machine translation of JP 2003-321628 A (Nov. 14, 2003).*

* cited by examiner

*Primary Examiner* — Vu A Nguyen
(74) *Attorney, Agent, or Firm* — SOLARIS Intellectual Property Group, PLLC

(57) ABSTRACT

A pigment dispersion including a pigment and a block polymer including a repeating unit including a hetero ring residue or an anthraquinone ring residue of a colorant is disclosed.

11 Claims, No Drawings

PIGMENT DISPERSION AND INK COMPOSITION USING THE SAME

CROSS-REFERENCE TO RELATED APPLICATION

This application claims priority under 35 USC 119 from Japanese Patent Application No. 2009-225191 filed on Sep. 29, 2009, the disclosure of which is incorporated by reference herein.

BACKGROUND OF THE INVENTION

1. Technical Field

The invention relates to a pigment dispersion and an ink composition using the pigment dispersion.

2. Description of the Related Art

When pigment is used as a colorant in colored compositions of various kinds, it is important to secure dispersibility and dispersion stability of the pigment in the form of a solid. By using a pigment dispersion that exhibits excellent dispersibility and dispersion stability of the pigment, it is possible to obtain a curable composition or an ink composition that exhibits a uniform color hue. In particular, a pigment that exhibits excellent light fastness is generally included in the ink composition, and when this pigment has a problem in its dispersibility, it may cause various problems such as nonuniform color tone, or degradation in dischargeability when the ink composition is used for an ink jet recording method.

In recent years, an ink jet recording method has been attracting attention as an image recording method in which an image is formed on a recording medium based on image data signals. The ink jet recording method also has advantages in that the recording device produces less noise, and that an image with high sharpness can be recorded at low running cost by discharging extremely small droplets.

According to the inkjet recording method, printing can be performed not only on ordinary paper but also on recording media that do not absorb a liquid, such as a plastic sheet or a metal plate. Further, in order to realize a higher printing speed and a higher image quality, there is demand for shortening of time for drying and curing the ink. In this regard, there is a recording method in which ink that can be cured in a short period of time upon irradiation with actinic energy rays is used as an ink for inkjet recording. According to this method, a sharp image can be formed by curing ink droplets by irradiating with actinic energy rays immediately after the printing. The curable ink composition for inkjet of this kind needs to have a high degree of pigment dispersibility and stability over time thereof, in order to form a highly sharp image in which the ink exhibits an excellent color forming property, and to discharge the ink composition in a stable manner.

In order to impart a vivid color tone and a high coloring power to the ink composition, microparticulation of the pigment is necessary. In particular, in the case of ink composition that is used for inkjet recording, discharged ink droplets largely affect the sharpness of the image. Therefore, it is necessary to discharge the droplets in small amounts and use particles having a smaller size than the thickness of the cured film formed from the ink composition. However, as the pigment particles are micronized in order to obtain a high coloring power, it becomes difficult to disperse the particles and an aggregation tends to be formed. Moreover, there may be a problem in that the viscosity is increased as a result of excessive addition of the dispersant. Since the formation of a pigment aggregation and the increase in viscosity of the ink composition both adversely affect the dischargeability of the ink, it is not preferred to use an ink composition in which an aggregation of pigment is formed or the viscosity is increased for inkjet recording.

Further, when an ink composition is used for inkjet recording, the ink composition must have an excellent heat cycle property. The ink composition for inkjet recording is contained in a cartridge and is heated in order to lower the liquid viscosity at the time of discharging, but the temperature of the ink composition is decreased when discharge is not performed or during storage. Therefore, the ink composition is subject to temperature changes of repeating heating and cooling. These temperature changes also adversely affect the pigment dispersibility, and there are problems in that the dispersibility of the pigment is lowered through time, and chances of forming an aggregation of the pigment or increasing the viscosity are increased.

Various proposals have been made on a dispersant used for obtaining a stable ink composition, including an ink composition in which a pigment derivative is used as a dispersant in order to improve the affinity for the pigment (for example, Japanese Patent Application Laid-Open (JP-A) No. 2003-119414 and JP-A No. 2004-18656); an ink composition in which a polymer having a basic group is used as a dispersant with respect to a pigment of a specific kind such as phthalocyanine or quinacridone (for example, JP-A No. 2003-321628); an ink composition in which a dispersant such as poly(ethyleneimine)-poly(12-hydroxystearic acid) graft polymer and a monomer of a specific kind that dissolves the dispersant, which ink composition does not include an organic solvent (for example, JP-A No. 2004-131589); and an ink composition in which a graft copolymer having a hetero ring residue that forms an organic pigment is used as a dispersant (for example, JP-A No. 2007-9117).

It is true that the pigment dispersant or the ink composition disclosed in these documents can finely disperse the pigment, and that the stability of the ink composition can be increased as compared with conventional ink compositions. However, stability of the ink composition, particularly dispersion stability of the ink composition after a long-term storage or after undergoing repeated temperature changes, has yet to be improved.

In view of the above, a block pigment dispersant is proposed in which a block polymer including blocks each supporting different properties such as solvent solubility is used (for example, Examined Japanese Patent Application Publication No. 3590382, JP-A No. 2007-112932 and JP-A No. 2008-56806). Examples of the block polymer include a block polymer including a methacrylate block, a block having an amino group and a block having hydroxyacrylate, a polymer having a urethane block and an acrylate block, and a block polymer formed by including plural blocks each consisting only of an acidic group. In any of these cases, further improvement has been desired from the viewpoint of achieving dispersion stability that is sufficient to be applied to an ink composition containing micronized particles of the pigment.

SUMMARY OF THE INVENTION

According to an aspect of the present invention, a pigment dispersion including (a) a pigment; and (b) a block polymer comprising a repeating unit including a hetero ring residue or an anthraquinone ring residue of a colorant (which may also be referred to as "specific polymer"), is provided.

According to another aspect of the present invention, an ink composition including the pigment dispersion of an aspect of the present invention, is provided.

DETAILED DESCRIPTION OF THE INVENTION

Pigment Dispersion

The pigment dispersion according to the invention at least includes (a) a pigment and (b) a specific polymer, preferably a block polymer including a repeating unit represented by the following Formula (1). The pigment dispersion according to the invention may be suitably used for an ink composition by further including (c) a polymerizable compound.

In the pigment dispersion according to the invention, increase in viscosity may be suppressed, dispersibility of the pigment may be, and dispersion stability of the pigment may be maintained, due to the function of the specific polymer, even when micronized particles of the pigment are included therein at high concentration. Further, when a pigment having a small particle size is selected as the pigment, a pigment dispersion that exhibits an excellent color forming property and an excellent coloring power can be obtained.

Since the pigment dispersion according to the invention may exhibit favorable dispersibility and dispersion stability of the pigment, it is applicable to various applications by diluting the same, these applications including an ink composition, a colored curable composition and a resist for a color filter. Further, since the ink composition including the pigment dispersion according to the invention may exhibit excellent dispersion stability even at low viscosity, the ink composition may exhibit excellent discharge stability when it is applied to an inkjet recording method to print an image.

When the pigment dispersion according to the invention further includes, in addition to (a) pigment and (b) specific polymer, optional components such as (c) polymerizable compound and (d) polymerization initiator, it can be suitably used as a colored curable composition that can be cured by irradiating with actinic energy rays. The colored curable composition of this kind may be suitably used as a curable ink composition that is curable upon irradiation with actinic energy rays or heating, particularly as an ink composition for inkjet. The ink composition for inkjet, in which the pigment dispersion according to the invention is used, may exhibit a vivid color tone and a high coloring power, and is capable of forming a high quality image. Further, the ink composition for inkjet of this kind may also be suitably used for producing printed materials having a large area, since a high quality image can be directly formed by using this ink composition according to digital data, even on a non-absorbing recording medium.

The pigment dispersion according to the invention may also be applied to ordinary printing, in addition to ink compositions such as an ink composition for inkjet, by preparing an ink composition by mixing with chemical substances that impart desired properties. In this way, a sharp image having an excellent color forming property can be formed and a high grade printed material can be obtained. Specifically, since the ink composition according to the invention exhibits excellent dispersibility in an organic medium, an image having a vivid color hue can be formed even when the ink composition is used in a non-curable ink. Non-curable inks include ordinary ink compositions that include a film-forming polymer, a colorant and a solvent, and cures as a coating film after applying the same and removing the solvent therefrom. For example, a solvent ink, in which a volatile solvent such as cyclohexanone is used as the solvent, is one of the preferred embodiments.

Further, the colored curable composition, in which the pigment dispersion according to the invention is used, is also applicable not only to an ink composition but also to an optical shaping material, and is suitable for production of a resist, a color filter, an optical disk or the like. Moreover, the pigment dispersion according to the invention is suitable for applications in which a favorable color forming property is required or applications in which a lightfast colorant is required, for example, a wide range of areas including a nanoimprint composition and a surface coating agent.

In the following, each of the components used in the pigment dispersion according to the invention is described.

<(a) Pigment>

The pigment dispersion according to the invention includes (a) a pigment. In the pigment dispersion according to the invention, the pigment is uniformly and stably dispersed even when the pigment particles have a small diameter, due to the function of (b) a specific polymer that is described below.

Since the pigment dispersion according to the invention includes a pigment, it may be suitably used for applications in which the colorant needs to have weather resistance, for example, colored compositions such as an ink composition. Further, when this pigment dispersion is used as a colorant component in various kinds of compositions, a dye may be used in combination for the purpose of adjusting the color hue or the like.

The pigment included in the pigment dispersion according to the invention is not particularly limited, and various kinds of known pigments may be appropriately selected and used according to purposes. For example, commonly used organic pigments, inorganic pigments, and even dyed resin particles are applicable as the pigment. Typically, any commercially available pigments are usable. Further, pigments that are previously treated with a pigment dispersant or a surface treatment agent that is commercially available, such as a pigment dispersed in an insoluble resin or the like serving as the dispersant, or a pigment having a surface on which a resin is grafted, can be used as long as the effect of the invention is not impaired.

Exemplary pigments include those described in "Pigment Dictionary", edited by Seijiro Ito (2000), W. Herbst, K. Hunger "Industrial Organic Pigments", JP-A No. 2002-12607, JP-A No. 2002-188025, JP-A No. 2003-26978 and JP-A No. 2003-342503.

In particular, when (b) specific polymer used in the invention has, as the "hetero ring residue of a colorant", a hetero ring residue including a hetero ring included in an organic pigment, the specific polymer may exhibit an excellent adsorption ability with respect to an organic pigment that includes a ring structure that is the same as, or similar to, the hetero ring residue of the specific polymer. Therefore, in one preferred embodiment, such an organic pigment as above may be selected (i.e., as the pigment included in the pigment dispersion, an organic pigment which includes a hetero ring that is the same as or similar to the hetero ring residue of the (b) specific polymer, may be selected). Similarly, in an embodiment, when the (b) specific polymer includes an anthraquinone ring residue instead of a hetero ring residue, an anthraquinone pigment is preferably selected and included in the ink composition. Specific examples of such embodiments include an embodiment in which a quinacridone pigment is used as an organic pigment, and a polymer including a quinacridone residue is used as the (b) specific polymer.

Exemplary organic pigments and inorganic pigments include the following pigments.

From the viewpoint of color hue, examples of the pigments include yellow pigments, magenta pigments, blue pigments, cyan pigments, green pigments, orange pigments, brown pigments, violet pigments, black pigments and white pigments.

From the viewpoint of a colorant skeleton of the pigment, common examples of the pigments include phthalocyanine pigments, insoluble azo pigments, azo lake pigments, anthraquinone pigments, quinacridone pigments, dioxazine pigments, diketopyrrolopyrrole pigments, anthrapyrimidine pigments, anthanthrone pigments, indanthrone pigments, flavanthrone pigments, perinone pigments, perylene pigments, thioindigo pigments and quinophthalone pigments.

Examples of the yellow pigment include monoazo pigments such as C. I. Pigment Yellow 1 (e.g., Fast Yellow G), C. I. Pigment Yellow 74; disazo pigments such as C. I. Pigment Yellow 12 (e.g., Disazo Yellow), C. I. Pigment Yellow 17, C. I. Pigment Yellow 97, C. I. Pigment Yellow 3, C. I. Pigment Yellow 16, C. I. Pigment Yellow 83, C. I. Pigment Yellow 155 and C. I. Pigment Yellow 219; azo lake pigments such as C. I. Pigment Yellow 100 (e.g., Tartrazine Yellow Lake); condensed azo pigments such as C. I. Pigment Yellow 95 (e.g., Condensed Azo Yellow), C. I. Pigment Yellow 93, C. I. Pigment Yellow 94, C. I. Pigment Yellow 128 and C. I. Pigment Yellow 166; acidic dye lake pigments such as C. I. Pigment Yellow 115 (e.g., Quinorine Yellow Lake); basic dye lake pigments such as C. I. Pigment Yellow 18 (e.g., Thioflavin Lake); anthraquinone pigments such as Flavanthrone Yellow (Y-24); isoindolinone pigments such as Isoindolinone Yellow 3RLT (Y-110); quinophthalone pigments such as Quinophthalone Yellow (Y-138); isoindoline pigments such as Isoindoline Yellow (Y-139) and C. I. Pigment Yellow 185; pyrazolone pigments such as C. I. Pigment Yellow 60 (e.g., Pyrazolone Yellow); nitroso pigments such as C. I. Pigment Yellow 153 (e.g., Nickel Nitroso Yellow); metal complex salt pigments such as C. I. Pigment Yellow 150; metal complex salt azomethine pigments such as C. I. Pigment Yellow 117 (e.g., Copper Azomethine Yellow); and acetolone pigments such as C. I. Pigment Yellow 120 (Benzimidazolone Yellow), C. I. Pigment Yellow 154, C. I. Pigment Yellow 167, C. I. Pigment Yellow 151, C. I. Pigment Yellow 175, C. I. Pigment Yellow 180, C. I. Pigment Yellow 181 and C. I. Pigment Yellow 194.

Examples of the pigment that exhibits a red or magenta color include monoazo pigments such as C. I. Pigment Red 3 (e.g., Toluidine Red); B-naphthol pigments such as C. I. Pigment Red 1, C. I. Pigment Red 4 and C. I. Pigment Red 6; disazo pigments such as C. I. Pigment Red 38 (e.g., Pyrazolone Red B); C. I. Pigment Red 53:1 (e.g., Lake Red C); C. I. Pigment Red 57:1 (Brilliant Carmine 6B); C. I. Pigment Red 52:1 and C. I. Pigment Red 48 (B-oxynaphthoic Acid Lake); condensed azo pigments such as C. I. Pigment Red 144 (e.g., Condensed Azo Red), C. I. Pigment Red 166, C. I. Pigment Red 220, C. I. Pigment Red 214, C. I. Pigment Red 221 and C. I. Pigment Red 242; acidic dye lake pigments such as C. I. Pigment Red 174 (e.g., Phloxine B Lake) and C. I. Pigment Red 172 (e.g., Erythrosine Lake); basic dye lake pigments such as C. I. Pigment Red 81 (e.g., Rhodamine 6G' Lake); anthraquinone pigments such as C. I. Pigment Red 177 (e.g., Dianthraqninonyl Red); thioindigo pigments such as C. I. Pigment Red 88 (e.g., Thioindigo Bordeaux); perinone pigments such as C. I. Pigment Red 194 (e.g., Perinone Red); perylene pigments such as C. I. Pigment Red 149 (e.g., Perylene Scarlet), C. I. Pigment Red 179, C. I. Pigment Red 178, C. I. Pigment Red 190, C. I. Pigment Red 224, C. I. Pigment Red 123 and C. I. Pigment Red 224; quinacridone pigments such as C. I. Pigment Violet 19 (Unsubstituted Quinacridone), C. I. Pigment Red 122, C. I. Pigment Red 42 (e.g., Quinacridone Magenta), C. I. Pigment Red 262, C. I. Pigment Red 207 and C. I. Pigment Red 209; isoindolinone pigments such as C. I. Pigment Red 180 (e.g., Insoindolinone Red 2BLT); alizarin lake pigments such as C. I. Pigment Red 83 (e.g., Madder Lake); naphtholone pigments such as C. I. Pigment Red 171, C. I. Pigment Red 175, C. I. Pigment Red 176, C. I. Pigment Red 185 and C. I. Pigment Red 208; naphthol AS lake pigments such as C. I. Pigment Red 247; naphthol AS pigments such as C. I. Pigment Red 2, C. I. Pigment Red 5, C. I. Pigment Red 21, C. I. Pigment Red 170, C. I. Pigment Red 187, C. I. Pigment Red 256, C. I. Pigment Red 268 and C. I. Pigment Red 269; and diketopyrrolopyrrole pigments such as C. I. Pigment Red 254, C. I. Pigment Red 255, C. I. Pigment Red 264 and C. I. Pigment Red 27.

Examples of the pigment that exhibits a blue or cyan color include disazo pigments such as C. I. Pigment Blue 25 (e.g., Dianisidine Blue); phthalocyanine pigments such as C. I. Pigment Blue 15, C. I. Pigment Blue 15:1, C. I. Pigment Blue 15:2, C. I. Pigment Blue 15:3, C. I. Pigment Blue 15:4, C. I. Pigment Blue 15:6 and C. I. Pigment Blue 16 (e.g., Phthalocyanine Blue); acidic dye lake pigments such as C. I. Pigment Blue 24 (e.g., Peacock Blue Lake); basic dye lake pigments such as C. I. Pigment Blue 1 (e.g., Victoria Pure Blue BO Lake); anthraquinone pigments such as C. I. Pigment Blue 60 (e.g., Indanthrone Blue), and alkali blue pigments such as C. I. Pigment Blue 18 (Alkali Blue V-5:1).

Examples of the pigment that exhibits a green color include phthalocyanine pigments such as C. I. Pigment Green 7 (Phthalocyanine Green) and C. I. Pigment Green 36 (Phthalocyanine Green), and azo metal complex pigments such as C. I. Pigment Green 8 (Nitroso Green) and C. I. Pigment Green 10.

Examples of the pigment that exhibits an orange color include isoindoline pigments such as C. I. Pigment Orange 66 (Isoindoline Orange); anthraqninone pigments such as C. I. Pigment Orange 51 (Dichloropyranthrone Orange); B-naphthol pigments such as C. I. Pigment Orange 2, C. I. Pigment Orange 3 and C. I. Pigment Orange 5; naphthol AS pigments such as C. I. Pigment Orange 4, C. I. Pigment Orange 22, C. I. Pigment Orange 24, C. I. Pigment Orange 38 and C. I. Pigment Orange 74; isoindolinone pigments such as C. I. Pigment Orange 61; perinone pigments such as C. I. Pigment Orange 43; disazo pigments such as C. I. Pigment Orange 15 and C. I. Pigment Orange 16; quinacridone pigments such as C. I. Pigment Orange 48 and C. I. Pigment Orange 49; acetolone pigments such as C. I. Pigment Orange 36, C. I. Pigment Orange 62, C. I. Pigment Orange 60, C. I. Pigment Orange 64 and C. I. Pigment Orange 72; and pyrazolone pigments such as C. I. Pigment Orange 13 and C. I. Pigment Orange 34.

Examples of the pigment that exhibits a brown color include naphtholone pigments such as C. I. Pigment Brown 25 and C. I. Pigment Brown 32.

Examples of the pigment that exhibits a black color include carbon black, titanium black, indazine pigments such as C. I. Pigment Black 1 (Aniline Black) and perylene pigments such as C. I. Pigment Black 31 and C. I. Pigment Black 32.

Examples of the white pigment include basic lead carbonate ($2PbCO_3 \cdot Pb(OH)_2$, also referred to as silver white), zinc oxide (ZnO, also referred to as zinc white), titanium oxide ($TiO_2$, also referred to as titanium white), strontium titanate ($SrTiO_3$, also referred to as titanium strontium white). The inorganic particles used as white pigment may be a simple substance, or may be, for example, an oxide of silicon, aluminum, zirconium, titanium or the like, an organic metal compound, or composite particles formed together with an organic compound.

Among these, titanium oxide has a smaller specific gravity and a greater refraction index than that of the other white pigments, and is chemically and physically stable. Therefore, titanium oxide exhibits an excellent masking property and a high coloring power, as well as excellent durability with respect to acid, alkali or other environments. Accordingly, it is preferred to use titanium oxide as the white pigment. Of course, other white pigments (not limited to those mentioned above) may be used, as necessary.

Pigments having a color other than white exhibit a higher coloring power when the average particle diameter is smaller. Therefore, when the pigment dispersion according to the invention is applied to a pigment dispersion having a color other than white, the average particle diameter of the pigment included in the pigment dispersion is preferably approximately from 0.01 µm to 0.4 µm, more preferably from 0.02 µm to 0.3 µm. Further, the maximum particle diameter of the pigment is preferably 3 µm or less, more preferably 1 µm or less. The particle diameter of the pigment may be adjusted by selecting the type of pigment, dispersant and/or dispersing medium, conditions for dispersion, conditions for filteration, and/or the like. Further, when the pigment dispersion according to the invention is prepared as a white pigment dispersion that is applicable to a white ink composition or the like, the average particle diameter of the pigment included in the pigment dispersion is preferably from 0.05 µm to 1.0 µm, more preferably from 0.1 µm to 0.4 µm, from the viewpoint of imparting a sufficient masking property. The maximum particle diameter of the pigment used for the white pigment dispersion is also preferably 3 µm or less, more preferably 1 µm or less.

By controlling the particle diameter, it is possible to maintain storage stability of the pigment dispersion, transparency of the pigment dispersion, or curing sensitivity of the pigment dispersion, when it is applied to a curable composition. Further, it is possible to suppress clogging of head nozzles even when the pigment dispersion is applied to an ink composition for inkjet.

Since the pigment dispersion according to the invention includes the specific polymer that may exhibit excellent dispersibility and dispersion stability with respect to the pigment as a pigment dispersant, a uniform and stable pigment dispersion can be obtained even when pigment particles having a small particle size are used.

The particle diameter of the pigment in the pigment dispersion may be measured by a known measurement method. Specifically, the particle diameter of the pigment can be measured by a centrifugal light-transmission method, an X-ray diffraction/scattering method or a dynamic light-scattering method.

The concentration of the pigment in the pigment dispersion may be, for example, from 10% by mass to 50% by mass, preferably from 10% by mass to 30% by mass, more preferably from 15% by mass to 30% by mass.

The dispersion of the pigment may be performed by using a known dispersion apparatus such as a ball mill, a sand mill, a bead mill, an attritor, a roll mill, a jet mill, a homogenizer, a paint shaker, a kneader, an agitator, a HENSCHEL mixer, a colloid mill, an ultrasonic homogenizer, a pearl mill or a wet jet mill. The specific polymer as described below is preferably added during dispersing the pigment.

<(b) Specific Polymer>

The pigment dispersion according to the invention includes (b) a block polymer that includes a repeating unit having a hetero ring residue or an anthraquinone ring residue of a colorant ((b) specific polymer).

The "hetero ring residue of a colorant" is a concept that encompasses a residue of a hetero ring that is a cromophore atomic group or can form a chromophore atomic group or a residue of a hetero ring included in an organic pigment, and the like. In the present invention, a residue of an anthraquinone ring or a derivative thereof that is a cromophore atomic group or can form a chromophore atomic group may be used similarly to the hetero ring residue.

In the invention, (b) specific polymer functions as a dispersant for (a) pigment used in combination with the specific polymer. The mechanism of this function has not been clear, but is presumed to be that since (b) specific polymer has high affinity for the pigment and has a block formed of repeating units that may exhibit a favorable adsorption ability with respect to the pigment, i.e., a partial structure having a certain degree of chain length and having a favorable adsorption ability with respect to the pigment, this block is adsorbed to the pigment with high efficiency.

In a preferred embodiment of the invention as described below, this effect is particularly remarkable because of having the partial structure having a favorable adsorption ability with respect to the pigment (block that can be adsorbed to the pigment) at high concentration at an end of the polymer main chain. Further, since aggregation of the pigment may be effectively suppressed due to a steric repulsion effect of the polymer main chain portion in (b) specific polymer, favorable dispersion stability can be achieved. As a result, it is presumed that dispersibility and dispersion stability of the pigment in the ink composition can be improved even when the pigment dispersion including the compound as mentioned above is applied to the ink composition, and that increase in viscosity or decrease in ink dischargeability due to aggregation or sedimentation of the pigment can be effectively suppressed.

As described above, the block formed of repeating units having a hetero ring residue or an anthraquinone ring residue of a colorant serves as a pigment-adsorptive portion, while other portions exhibit affinity for a solvent or a steric repulsion effect, whereby the effects can be improved. Therefore, in (b) specific polymer, a repeating unit having a partial structure that exhibits affinity for a solvent is preferably included in combination with the repeating unit having a hetero ring residue or an anthraquinone ring residue of a colorant, and the type of this repeating unit (repeating unit having a partial structure that exhibits affinity for a solvent) may be appropriately selected according to the type of the solvent to be used.

In the invention, (b) specific polymer may be used as a pigment dispersant since it can function as a pigment dispersant.

The "hetero ring residue of a colorant" included in (b) specific polymer has at least one hydrogen-bond group in the molecule, and examples thereof include those formed by removing one hydrogen atom from thiophene, furan, xanthene, pyrrole, imidazole, isoindoline, isoindolinone, benzimidazolone, indole, quinoline, carbazole, acridine, acridone, quinacridone, phthalimide, quinaldine and quinophthalone. Similarly, an anthraquinone ring residue is preferably used, although the anthaquinone ring is not included in the definition of a hetero ring to be exact. Among these, the hetero ring residue derived from benzimidazole, indole, quinoline, carbazole, acridine, acridone, quinacridone or phthalimide or an anthraquinone ring residue is particularly preferred.

The repeating unit having a hetero ring residue or an anthraquinone ring residue as mentioned above is preferably a repeating unit represented by the following Formula (1). By forming a block polymer having a repeating unit represented by Formula (1), a strong adsorption effect between the pigment and the block polymer may be achieved, and dispersion stability due to a steric repulsion effect among the polymer chains of the block polymer adsorbed to the surface of the pigment may be remarkably improved.

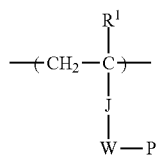

(1)

In Formula (1), $R^1$ represents a hydrogen atom or a methyl group, J represents —CO—, —COO—, —CONR$^2$—, —OCO— or a phenylene group, $R^2$ represents a hydrogen atom, an alkyl group, an aryl group or an arylalkyl group, W represents a single bond or a divalent linking group, and P represents a hetero ring residue including a hetero ring of a colorant or an anthraquinone ring residue including an anthraquinone ring of a colorant.

In Formula (1), $R^1$ represents a hydrogen atom or a methyl group.

In Formula (1), J represents —CO—, —COO—, —CONR$^2$—, —OCO— or a phenylene group. Among these, J is preferably —COO—, —CONH— or a phenylene group, particularly preferably —COO— or a phenylene group.

$R^2$ is a hydrogen atom, an alkyl group, an aryl group or an arylalkyl group. Examples of the alkyl group include a methyl group, an ethyl group, an n-propyl group, an i-propyl group, an n-butyl group, an n-hexyl group, an n-octyl group, a 2-hydroxyethyl group, a phenylmethyl group and a phenylethyl group. Examples of the aryl group include a phenyl group. $R^2$ is preferably a hydrogen atom, a methyl group or an ethyl group.

In Formula (1), W represents a single bond or a divalent linking group.

Examples of the divalent linking group represented by W include a linear, branched or cyclic alkylene group or an arylalkylene group, which may have a substituent.

When W represents a divalent linking group, examples thereof include a linear, branched or cyclic alkylene group, an arylalkylene group, an arylene group, or a linking group in which two or more of these groups are combined.

Examples of the substituent that can be introduced in the linking group represented by W include an alkyl group such as a methyl group, an ethyl group, a propyl group, an isopropyl group, a butyl group, an s-butyl group, a t-butyl group, a hexyl group or a cyclohexyl group, an alkoxy group such as a methoxy group, an ethoxy group, a propoxy group, an isopropoxy group or a butoxy group, a hydroxyl group, an amino group, a nitro group, a halogen atom, a thioether group, and a functional group containing a silicon atom, for example, a functional group containing a silyl group, such as a trialkylsilyl group or an alkoxysilyl group. Among these, an alkyl group, a hydroxyl group or an alkoxy group are preferred.

When W represents an alkylene group, preferred examples thereof include an alkylene group of 1 to 10 carbon atoms, more preferably an alkylene group of 1 to 4 carbon atoms. Specific examples of the alkylene group include a methylene group, an ethylene group, a propylene group, a butylene group, a pentylene group, a hexylene group, an octylene group and a decylene group. Among these, a methylene group, an ethylene group and a propylene group are particularly preferred.

When W represents an arylalkylene group, preferred examples thereof include an arylalkylene group of 7 to 13 carbon atoms, and specific examples thereof include a benzylidene group and a cinnamylidene group.

When W represents an arylene group, preferred examples thereof include an arylene group of 6 to 12 carbon atoms, and specific examples thereof include a phenylene group, a cumenylene group, a mesitylene group, a tolylene group and a xylylene group. Among these, a phenylene group is particularly preferred.

The divalent linking group represented by W may include therein —NR$^3$—, —NR$^3$R$^4$—, —COO—, —OCO—, —O—, —SO$_2$NH—, —NHSO$_2$—, —NHCOO—, —OCONH—, —NHCONH—, or a group derived from a hetero ring, as a linking group.

In the above, $R^3$ and $R^4$ each independently represent a hydrogen atom or an alkyl group, and preferred examples thereof include a hydrogen atom, a methyl group, an ethyl group and a propyl group.

Among the linking groups represented by W, a single bond, an alkylene group of 1 to 8 carbon atoms, an alkylene group of 1 to 8 carbon atoms in which —COO—, —O—, —NH-COO—, —OCONH— or —NHCONH— is included as a linking group, and a 2-hydroxypropylene group are preferred; a hydrogen atom, an alkylene group of 1 to 8 carbon atoms and a 2-hydroxypropylene group are more preferred; and a methylene group, an ethylene group and a 2-hydroxypropylene group are particularly preferred.

In Formula (1), P represents a hetero ring residue or an anthraquinone ring residue of a colorant, and examples of the colorant with respect to P include the organic pigment as described in the section concerning (a) pigment, the oil-soluble dyes or water-soluble dye used in combination with the pigment, and the colorant is preferably an organic pigment.

Examples of the hetero ring residues represented by P include the hetero ring residues as mentioned above, and preferred examples thereof are also the same. Similarly an anthraquinone ring residue is preferable.

When the pigment dispersion according to the invention includes an organic pigment as the pigment, P is preferably a residue of a ring (hetero ring or anthraquinone ring) which has a structure that is the same as, or similar to, the structure of a hetero ring or anthraquinone ring included in the organic pigment, in view of the effect of the invention. Specifically, for example, when a quinacridone pigment is used as (a) pigment in the pigment dispersion according to the invention, P in Formula (1) is preferably a hetero ring residue derived from a hetero ring such as acridone, which has a similar structure to that of the hetero ring of quinacridone, or an anthraquinone ring residue derived from an anthraquinone ring, which has a similar structure to that of the hetero ring of quinacridone. That is, due to the action of Van-der-Waals interaction derived from the hetero ring residue or anthraquinone ring residue P in the repeating unit represented by Formula (1), it is presumed that an extremely favorable adsorption ability with respect to the pigment is achieved.

The following are preferred specific examples of the repeating unit represented by Formula (1) included in (b) specific polymer according to the invention. However, the invention is not limited thereto.

M-1
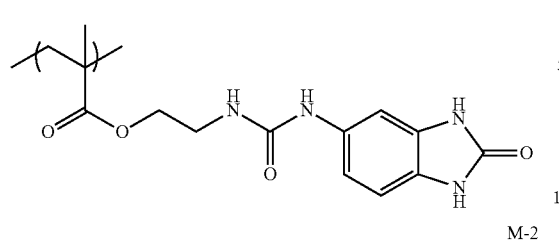
M-2
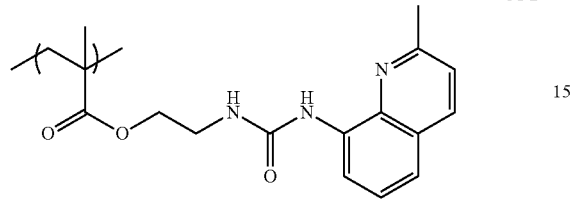
M-3
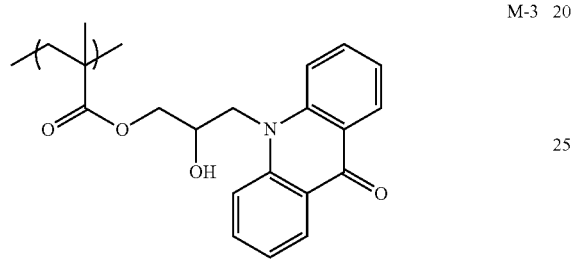
M-4
M-5
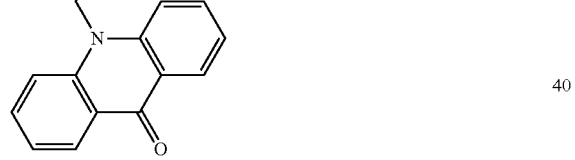
M-6
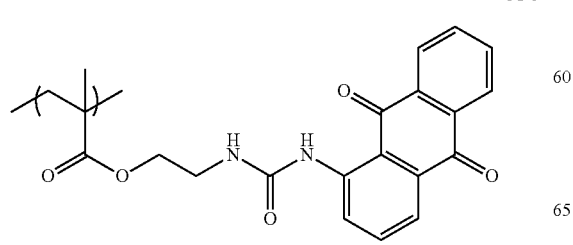
M-7
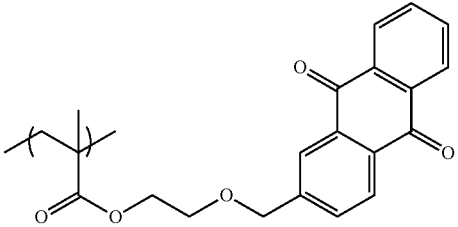
M-8
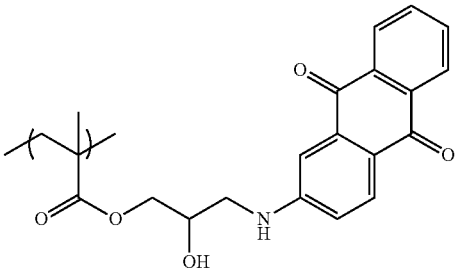
M-9
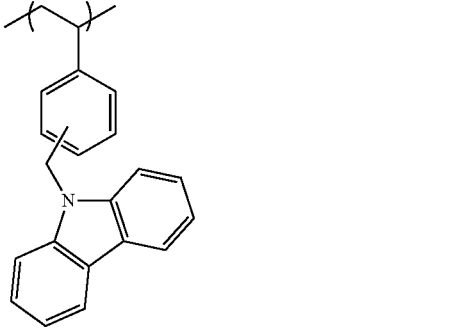
M-10
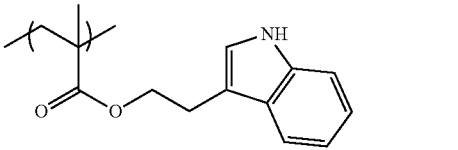
M-11
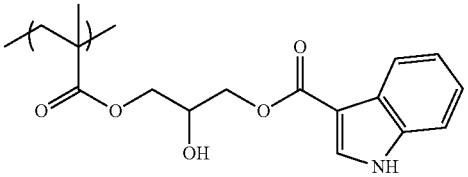
M-12
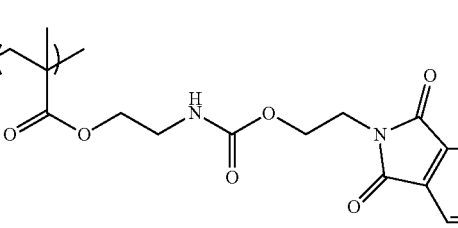

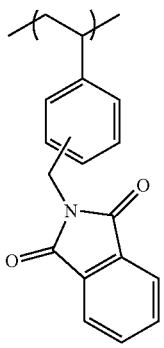

M-13

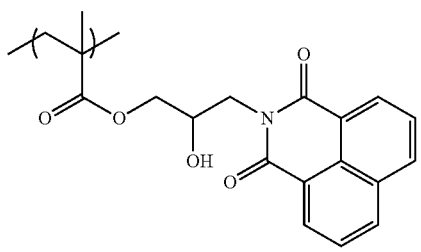

M-14

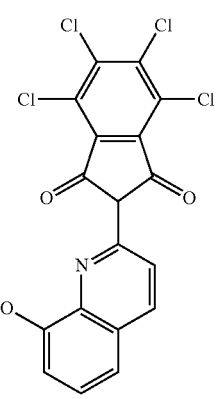

M-15

The ratio of repeating unit represented by Formula (1) included in (b) specific polymer is preferably from 2% by mass to 50% by mass, more preferably from 5% by mass to 40% by mass, most preferably from 5% by mass to 30% by mass, with respect to the mass of (b) specific polymer. When the ratio of the repeating unit represented by Formula (1) is within this range, a sufficient adsorption ability of (b) specific polymer with respect to the pigment may be obtained and the increase in viscosity due to a polymer that is not adsorbed to the pigment may be suppressed, whereby the viscosity of the pigment dispersion may be maintained to be within a suitable range.

(b) specific polymer included in the dispersion used in the invention is a block polymer.

The block polymer means a copolymer in which monomers thereof exist in a relatively long alternate alignment in the chain, the alignment may be, for example, AB, ABA, ABAB, ABABA, ABC or ABCBA, where A, B and C each represent a block of monomer of the same kind Preferred block polymers are AB and ABC block polymers, and the AB block polymer is particularly preferred.

In the specific block polymer, examples of the block portion that can be bound to the block portion formed of the repeating unit represented by Formula (1) having affinity for the pigment include a block portion formed of a repeating unit having affinity for a solvent. The polymer structure including repeating units having affinity for the solvent may be selected from known polymers or the like, according to purposes or the like.

The main chain structure in (b) specific polymer according to the invention is preferably at least one kind selected from the group consisting of a polymer or a copolymer including a vinyl monomer, an ester-based polymer, an ether-based polymer, a urethane-based polymer, an amide-based polymer, an epoxy-based polymer, a silicone-based polymer, and a derivative or a copolymer of these polymers. Among these, at least one kind selected from the group consisting of a polymer or a copolymer of a vinyl monomer, an ester-based polymer, an ether-based polymer, a urethane-based polymer and a derivative or a copolymer of these polymers are more preferred, and a polymer or a copolymer of a vinyl monomer is particularly preferred.

The copolymers mentioned herein include any combination of the aforementioned polymers, such as a polyether/polyurethane copolymer and a copolymer of polyether/polymer of a vinyl monomer.

Further, the polymer that forms a block portion having affinity for the solvent is preferably soluble in an organic solvent. When the affinity for the organic solvent is too small, for example, when used for the pigment dispersion, affinity for a dispersion medium may be weakened and an adsorption layer that is sufficient for stabilizing the dispersion may not be secured.

Examples of the synthesis method of a block polymer include a method in which polymers having a reactive group at a terminal thereof (for example, an OH group and a COOH group) are condensed, and a living polymerization method. Examples of the living polymerization method include a polymerization method of using nitroxide, and a living radical polymerization method such as an ATRP method or an RAFT method. In the invention, the block polymer is preferably synthesized by a living radical polymerization method selected from an ATRP method or an RAFT method. The initiator, catalyst or the like used in the living radical polymerization method may be selected from known compounds. For example, any of the initiators, catalysts and the like described in "Progress in Polymer Science", 2004, 29(4), pp. 329-385 may be used in the living radical polymerization method.

In the following, monomers as a raw material for forming a polymer that serves as a block portion having affinity for a solvent in (b) specific polymer are explained.

The vinyl monomer is not particularly limited, but preferred examples include (meth)acrylate esters, crotonate esters, maleic acid diesters, fumaric acid diesters, itaconic acid diesters, (meth)acrylamides, styrenes, vinyl ketones, maleimides and (meth)acrylonitrile.

In the following, preferred examples of these vinyl monomers are explained.

Examples of (meth)acrylate esters include methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, amyl(meth)acrylate, n-hexyl(meth)acrylate, cyclohexyl(meth)acrylate, t-butylcyclohexyl(meth)acrylate, 2-ethylhexyl(meth)acrylate, t-octyl(meth)acrylate, dodecyl(meth)acrylate, octadecyl(meth)acrylate, acetoxyethyl(meth)acrylate, phenyl(meth)acrylate, 2-hydroxyethyl(meth)acrylate, 2-hydroxypropyl(meth)acrylate, 3-hydroxypropyl(meth)acrylate, 2-ethoxyethyl(meth)acrylate, 2-(2-methoxyethoxy)ethyl(meth)acrylate, 2-chloroethyl(meth)acrylate, glycidyl(meth)acrylate, vinyl(meth)acrylate, 1-propenyl(meth)acrylate, allyl(meth)acrylate, aryloxyethyl (meth)acrylate, propargyl(meth)acrylate, benzyl(meth)acrylate, diethylene glycol monomethyl ether(meth)acrylate, diethylene glycol monoethyl ether(meth)acrylate, triethylene glycol monomethyl ether(meth)acrylate, triethylene glycol monoethyl ether(meth)acrylate, β-phenoxyethoxyethyl (meth)acrylate, dicyclopentenyl(meth)acrylate, dicyclopentenyloxyethyl(meth)acrylate, trifluoroethyl(meth)acrylate, octafluoropentyl(meth)acrylate, perfluorooctylethyl(meth)acrylate, dicyclopentanyl(meth)acrylate, tribromophenyl (meth)acrylate, tribromophenyloxyethyl(meth)acrylate and (meth)acrylic acid-γ-butylolactone.

Examples of the crotonate esters include butyl crotonate and hexyl crotonate.

Examples of the maleic diesters include dimethyl maleate, diethyl maleate and dibutyl maleate.

Examples of the fumaric acid diesters include dimethyl fumarate, diethyl fumarate and dibutyl fumarate.

Examples of the itaconic acid diesters include dimethyl itaconate, diethyl itaconate and dibutyl itaconate.

Examples of the (meth)acrylamides include (meth)acrylamide, N-methyl(meth)acrylamide, N-ethyl(meth)acrylamide, N-propyl(meth)acrylamide, N-isopropyl(meth)acrylamide, N-n-butyl(meth)acrylamide, N-t-butyl(meth)acrylamide, N-cyclohexyl(meth)acrylamide, N-(2-methoxyethyl)(meth)acrylamide, N,N-dimethyl(meth)acrylamide, N,N-diethyl(meth)acrylamide, N-phenyl(meth)acrylamide, N-benzyl(meth)acrylamide, (meth)acryloyl morpholine, diacetone acrylamide, N-methylol acrylamide, N-hydroxyethyl acryalmide, vinyl(meth)acrylamide, N,N-diallyl(meth)acrylamide and N-allyl(meth)acrylamide.

Examples of the styrenes include styrene, methyl styrene, dimethyl styrene, trimethyl styrene, ethyl styrene, isopropyl styrene, butyl styrene, hydroxy styrene, methoxy styrene, butoxy styrene, acetoxy styrene, chloro styrene, dichloro styrene, bromo styrene, chloromethyl styrene, hydroxy styrene protected by a group that can be deprotected using an acidic substance (such as t-Boc (t-botoxycarbonyl)), methyl vinyl benzoate and α-methyl styrene.

Examples of the vinyl ketones include methyl vinyl ketone, ethyl vinyl ketone, propyl vinyl ketone and phenyl vinyl ketone.

Examples of the olefins include ethylene, propylene, isobutylene, butadiene and isoprene.

Examples of the maleimides include maleimide, butyl maleimide, cyclohexyl maleimide and phenyl maleimide.

It is also possible to use (meth)acrylonitrile, a hetero ring group substituted by a vinyl group (such as vinyl pyridine, N-vinyl pyrrolidone or vinyl carbazole), N-vinyl formamide, N-vinyl acetamide, N-vinyl imidazole, vinyl caprolactone, and the like.

Other than the above compounds, vinyl monomers having a functional group, such as a urethane group, a urea group, a sulfone amide group, a phenol group or an imide group, are also applicable. Such monomers having a urethane group or a urea group may be appropriately synthesized by, for example, utilizing addition reaction of an isocyanato group with a hydroxyl group or an amino group. Specifically, these monomers can be synthesized, for example, by addition reaction of a monomer including an isocyanato group with a compound having one hydroxyl group or a compound having one primary or secondary amino group; or by addition reaction of a monomer including a hydroxyl group or a monomer including a primary or secondary amino group with a monoisocyanate.

When forming (b) specific polymer used in the invention by combining a repeating unit having affinity for a pigment as typified by the repeating unit represented by Formula (1) and a repeating unit having affinity for a solvent as mentioned above, the combination is not limited to that of two kinds of repeating units. For example, it is also possible to combine three kinds of repeating units having different structures as the combination of the repeating unites including the repeating unit having affinity for the pigment and as the repeating unit having affinity for the solvent. In that case, the specific polymer is formed as an ABC block polymer.

Further, (b) specific polymer used in the invention may include a further repeating unit other than the repeating unit having affinity for a pigment as typified by the repeating unit represented by Formula (1) or a repeating unit having affinity for a solvent as mentioned above. Examples of the further repeating unit include a repeating unit derived from a polymerizable oligomer having an ethylenically unsaturated double bond at its terminal (hereinafter, also simply referred to as polymerizable oligomer, sometimes), and a block copolymer including such a repeating unit is also a preferred embodiment. In that case, the specific polymer also forms an ABC block polymer.

The polymerizable oligomer having an ethylenically unsaturated double bond at its terminal, which may be suitably used as a further repeating unit as mentioned above, may also be referred to as a macromonomer, since it is a compound having a certain degree of molecular weight.

When (b) specific polymer has the repeating unit derived from a further monomer that can be copolymerized, in addition to the repeating unit represented by Formula (1) and the repeating unit having affinity for a solvent, the ratio of the repeating unit derived from the further monomer may be in a range of from 5% by mass to 30% by mass, with respect to the total repeating units included in the specific polymer.

The weight average molecular weight (Mw) of (b) specific polymer according to the invention is, for example, preferably from 1,000 to 200,000, more preferably from 2,000 to 100,000, further preferably from 5,000 to 80,000. The weight average molecular weight (Mw) can be measured by, for example, gel permeation chromatography (carrier: tetrahydrofuran or dimethylformamide), and can be calculated as a weight average molecular weight in terms of polystyrene.

The content of (b) specific polymer in the pigment dispersion according to the invention is preferably from 2 parts by mass to 100 parts by mass, more preferably from 2 parts by mass to 50 parts by mass, with respect to 100 parts by mass of the pigment in the pigment dispersion.

When the content of (b) specific polymer is within the above range, sufficient dispersibility of the pigment may be obtained and aggregation of the pigment may be suppressed. Moreover, increase in viscosity of the pigment dispersion may be suppressed, thereby maintaining the viscosity within a favorable range.

In the pigment dispersion according to the invention, a known pigment dispersant may be used in combination with the specific polymer, as long as the effect of the invention is not impaired.

When the known pigment dispersant is included in the pigment dispersion, the amount thereof is preferably 50% by mass or less, with respect to the specific polymer as mentioned above.

The pigment dispersion according to the invention may include a pigment derivative represented by the following Formula (A) (hereinafter, also referred to as pigment derivative or a synergist). In the invention, the pigment derivative functions as a dispersion aid for the pigment dispersant to be used in combination.

$$P-A_q \quad (A)$$

In Formula (A), P represents a group selected from the group consisting of a q-valent colorant prototype compound residue, an anthraquinone residue, an acridone residue and a triazine residue. A represents a basic substituent, an acidic substituent or a neutral substituent. q represents an integer of from 1 to 4.

The colorant prototype compound residue P indicates a residue formed by removing one hydrogen atom from a compound having a skeleton of a generally known colorant, or from a compound having a skeleton similar to that of the colorant but having almost no absorption in a visible light region. Examples of the colorant prototype compound residue include diketopyrrolopyrrole colorant-based residues, azo-based colorant residues (such as azo, disazo and polyazo colorants), phthalocyanine-based colorant residues, anthraquinone-based colorant residues (such as diaminodianthraquinone, anthrapyrimidine, flavanthrone, anthanthrone, indanthrone, pyranthrone and violanthrone), quinacridone-based colorant residues, dioxazine-based colorant residues, perinone-based colorant residues, perylene-based colorant residues, thioindigo-based colorant residues, isoindoline-based colorant residues, isoindolinone-based colorant residues, quinophthalone-based colorant residues, threne-based colorant residues, metal complex-based colorant residues, anthraquinone residues, and triazine residues.

Specific examples of the pigment derivative represented by Formula (A) include, but not limited thereto, the compounds described in Japanese Patent No. 3518300, Japanese Patent No. 2927118, Japanese Patent No. 3175516, Japanese Patent No. 3050205, Japanese Patent No. 3931644, Japanese Patent No. 3931649, Japanese Patent No. 3931654, Japanese Patent No. 2913956, Japanese Patent No. 3132314, Japanese Patent No. 3319123, Japanese Patent No. 3149707, Japanese Patent No. 2906833, Japanese Patent No. 3790279 and Japanese Patent No. 2629070; and JP-A No. 8-295808, JP-A No. 8-295810, JP-A No. 10-17802, JP-A No. 2002-294135, JP-A No. 2003-246960, JP-A No. 2003-294935, JP-A No. 2004-18656, JP-A No. 2004-204103, JP-A No. 2005-23100, JP-A No. 2006-348207, JP-A No. 2006-348200, JP-A No. 2006-348201, JP-A No. 2006-348202, JP-A No. 2006-348203, JP-A No. 2006-348204, JP-A No. 2006-348205, JP-A No. 2006-348206, JP-A No. 2007-9096, JP-A No. 2007-23196, JP-A No. 2007-63371, JP-A No. 2007-84659, JP-A No. 2007-131832, JP-A No. 2007-153915, JP-A No. 2007-191699, JP-A No. 2007-193312, JP-A No. 2007-231106, JP-A No. 2007-231107, JP-A No. 2007-254628, JP-A No. 2008-231012, JP-A No. 2008-239994, JP-A No. 2008-246469, JP-A No. 2008-310000, JP-A No. 2009-57477, JP-A No. 2009-57478 and JP-A No. 2009-62528.

In the invention, the pigment derivative may be used alone or in combination of two or more kinds thereof.

The content of the pigment derivative in the pigment dispersion or the ink composition according to the invention is preferably from 1 to 50% by mass, more preferably from 1 to 30% by mass, with respect to the amount of the pigment.

<Dispersion Medium>

In the pigment dispersion according to the invention, the dispersion medium used for dispersing components such as a pigment may be appropriately selected according to purposes. For example, a polymerizable compound having a low molecular weight may be used as the dispersing medium, or a solvent may be used as the dispersing medium.

When a solvent is used as the dispersing medium, known alcohol-based solvents, ester-based solvents, ether-based solvents, hydrocarbon-based solvents and the like are preferably used. Specifically, alkylene oxide monoalkyl ether, alkylene oxide monoalkyl ether acetate, alkylene glycol diacetate, dicarboxylic acid dialkyl ester, (meth)acrylates, divinyl ethers, and the like are preferred.

In this regard, when the pigment according to the invention is applied to a colored curable composition, such as a radiation-curable ink composition or the like as described below, for example, the ink composition preferably does not include a solvent that is not curable as described above, in order to cure the ink composition after application thereof on a recording medium. This is because the solvent resistance of the cured ink image may deteriorate if the solvent remains therein. Accordingly, in the ink composition, it is preferred to use (c) polymerizable compound as described below as the dispersion medium, especially by selecting a polymerizable compound having the lowest viscosity, from the viewpoint of improving dispersion suitability or handling ability of the ink composition.

When the pigment dispersion according to the invention is applied to the ink composition, it is preferred not to include a volatile solvent, as already mentioned above. However, a small amount of solvent, which has a high boiling point of 180° C. or higher, may be used.

The pigment dispersion according to the invention includes (a) pigment and (b) specific polymer, and is capable of providing a pigment dispersion that exhibits a vivid color tone. This is presumed to be because (b) specific polymer can increase the dispersibility and dispersion stability of the pigment.

Ink Composition

The ink composition according to the invention includes the pigment dispersion according to the invention as described above, i.e., a pigment dispersion including (a) pigment and (b) specific polymer.

Since the ink composition according to the invention includes a pigment dispersion that includes (b) specific polymer, favorable dispersibility or dispersion stability of the pigment may be achieved. Therefore, a uniform and stable ink composition may be obtained even when a pigment in the form of fine particles is used.

In the ink composition of this kind, (a) pigment functions as a colorant, and particles of the pigment having a small diameter are dispersed in the ink composition in a uniform and stable manner by the function of (b) specific polymer. As a result, the ink composition according to the invention may exhibit an excellent color forming property and a vivid color tone, as well as a high coloring power, thereby enabling formation of a high-quality image.

The ink composition according to the invention is applicable to various applications, including oily inks, aqueous inks and curable inks.

Among these, due to its excellent dispersibility and dispersion stability of the pigment having a small particle size, the ink composition according to the invention is preferably applied to curable inks, particularly preferably to curable inks used for inkjet applications.

The content of the pigment in the ink composition according to the invention is preferably within the following ranges.

Specifically, when the pigment is an organic pigment, the content thereof in the ink composition in terms of solid content is preferably from 1% by mass to 20% by mass, more preferably from 2% by mass to 15% by mass.

When the pigment is an inorganic pigment, the content thereof in the ink composition in terms of solid content is preferably from 1% by mass to 30% by mass, more preferably from 2% by mass to 25% by mass.

In the following, a specific embodiment in which the ink composition according to the invention is used as a curable ink, which is one of the preferred applications, is explained. However, the ink composition according to the invention is not limited to this application or embodiment.

As necessary, a further component may be appropriately selected and included in the ink composition according to the invention, in addition to the pigment dispersion according to the invention. Examples of the preferred components include (c) polymerizable compound or (d) photopolymerization initiator. When the ink composition includes these components, the ink composition according to the invention can be cured by irradiating the same with actinic energy rays.

The actinic energy rays that cure the ink composition according to the invention are not particularly limited, and may be appropriately selected according to purposes. Examples of the actinic energy rays include α-rays, γ-rays, X-rays, ultraviolet rays, visible rays and electron beams. In the invention, among these, ultraviolet rays and electron beams are preferred from the viewpoint of curing sensitivity and availability of the apparatus, and ultraviolet rays are particularly preferred.

In the following, components of the ink composition according to the invention, when it is applied to a curable ink, are explained.

<(c) Polymerizable Compound>

The ink composition according to the invention preferably includes a polymerizable compound. The polymerizable compound is not particularly limited as long as it is a compound that allows polymerization reaction to occur upon application of energy of some kind, and cures. The polymerizable compound may be used irrespective of whether it is a monomer, an oligomer or a polymer, but particularly preferably a known polymerisable monomer known as a radical polymerizable monomer or a cationic polymerizable monomer that allows polymerization reaction to occur by means of an initiation species generated from (d) polymerization initiator that is optionally added to the ink composition. Among these, from the viewpoint of stability, a radical polymerizable monomer and a cationic polymerizable monomer that does not include an oxysilane compound are more preferred.

The polymerizable compound may be used alone or in combination of two or more kinds thereof, for the purpose of adjusting the reaction speed, properties of the cured film, ink properties if the pigment dispersion is applied to the ink composition, and the like. Further, the polymerizable compound may be a monofunctional compound or a polyfunctional compound. When the ratio of the monofunctional compound is greater, the cured material tends to become softer, while when the ratio of the polyfunctional compound is greater, curability tends to become higher. Accordingly, the ratio between the monofunctional compound and the polyfunctional compound may be appropriately determined according to purposes.

—Photo Cationic Polymerizable Monomer—

The cationic polymerizable compound that may be used in the invention is not particularly limited, and a cationic polymerizable monomer of various kinds known as a photo cationic polymerizable monomer may be used, as long as it is a compound that initiates polymerization reaction by means of acid generated by a compound that generates acid when irradiated with radiation rays, and cures. Examples of the cationic polymerizable monomer include the epoxy compounds, vinyl ether compounds and other oxetane compounds that are not included in the specific polymerizable compound, described in JP-A No. 6-9714, JP-A No. 2001-31892, JP-A No. 2001-40068, JP-A No. 2001-55507, JP-A No. 2001-310938, JP-A No. 2001-310937 and JP-A No. 2001-220526.

Examples of the epoxy compound that may be used in the polymerizable compound according to the invention include aromatic epoxides, alicyclic epoxides and aliphatic epoxides. Among these, from the viewpoint of curability, aromatic epoxides and alicyclic epoxides are preferred, and alicyclic epoxides are particularly preferred.

Examples of the aromatic epoxides include di- or polyglycidyl ethers produced via reaction of a polyvalent phenol having at least one aromatic nucleus or an alkylene oxide adduct of the same with epichlorohydrin, and examples thereof include di- or polyglycidyl ether of bisphenol A or an alkylene oxide adduct of the same, di- or polyglycidyl ether of hydrogen-added bisphenol A or an alkylene oxide adduct of the same, and novolac-based epoxy resins. The alkylene oxides mentioned herein include ethylene oxide, propylene oxide and the like. Further, styrene oxides that can be obtained by epoxidating styrenes with an appropriate oxidizer such as hydrogen peroxide or a peracid.

Examples of the preferred alicyclic epoxides include compounds including cyclohexene oxide or cyclopentene oxide that are obtained by epoxidating a compound having at least one cycloalkane ring such as a cyclohexene or cyclopentene ring.

The types, specific compounds and preferred examples of the epoxides that may be used as a polymerizable compound in the invention include the compounds described in paragraphs [0037] to [0040] of JP-A No. 2008-13646. These compounds are applicable to the invention.

In addition to these epoxy compounds, preferred examples of the polyfunctional epoxy compound include EPOLEAD GT-300 (trade name, trifunctional, manufactured by Daicel Chemical Industries, Ltd.), EPOLEAD GT-400 (trade name, tetrafunctional, manufactured by Daicel Chemical Industries, Ltd.) and EPOLEAD PB-3600 (trade name, manufactured by Daicel Chemical Industries, Ltd.)

The vinyl ether compound may be either monofunctional or polyfunctional, and the type, specific compounds or preferred examples of vinyl ether compounds include those described in paragraphs [0042] to [0044] of JP-A No. 2008-13646.

Among these, di- or trivinyl ether compounds are preferred from the viewpoint of curability, adhesiveness to a recording medium or surface hardness of the formed image, and a divinyl ether compound is particularly preferred.

The oxetane compound that may be used in the invention may be either monofunctional or polyfunctional, and known oxetane compounds may be appropriately selected and used, such as those described in JP-A No. 2001-181386, JP-A No. 2001-220526, JP-A No. 2001-310937, JP-A No. 2003-341217 and JP-A No. 2004-91556. Compounds having an oxetane ring that may be used as the polymerizable compound according to the invention is preferably a compound having 1 to 4 oxetane rings in its structure. By using a compound of this kind, viscosity of the compound may be easily maintained to be within a range in which handling ability is favorable, and when applied to an ink composition, a high degree of adhesiveness between the compound after being cured and the recording medium may be obtained. The types, specific compounds and preferred examples of the compounds having an oxetane ring that can be used in combination with the polymerizable compound according to the invention include the compounds described in paragraphs [0021] to [0084] of JP-A No. 2003-341217, paragraphs [0022] to [0058] of JP-A No. 2004-91556 and paragraphs

[0045] to [0062] of JP-A No. 2008-13646. These compounds are applicable to the invention.

In the ink composition according to the invention, only one kind of the photo cationic polymerizable monomer may be used or two or more kinds may be combined. From the viewpoint of effectively suppressing contraction of the ink during curing, it is preferred to use at least one oxetane compound and at least one epoxy compound in combination, or at least one compound selected from an oxetane compound or an epoxy compound and a vinyl ether compound in combination. Further, a compound having an epoxy group and an oxetane group in the same molecule, as described in JP-A No. 2005-2191 or the like, is also preferably used.

—Photo Radical Polymerizable Monomer—

Examples of the photo radical polymerizable monomer that can be used as (c) polymerizable compound include (meth)acrylates, (meth)acrylamides and aromatic vinyls.

In the present specification, both of acrylate and methacrylate or either one of these may be referred to as (meth)acrylate, both of acrylamide and methacrylamide or either one of these may be referred to as (meth)acrylamide, and both of acrylic and methacrylic or either one of these may be referred to as (meth)acrylic, sometimes.

The (meth)acrylates may be either monofunctional (meth)acrylates or polyfunctional (meth)acrylates.

Examples of the monofunctional (meth)acrylates include hexyl(meth)acrylate, 2-ethylhexyl(meth)acrylate, tert-octyl(meth)acrylate, isoamyl(meth)acrylate, decyl(meth)acrylate, isodecyl(meth)acrylate, stearyl(meth)acrylate, isostearyl(meth)acrylate, cyclohexyl(meth)acrylate, 4-n-butylcyclohexyl(meth)acrylate, norbornyl(meth)acrylate, isobornyl(meth)acrylate, benzyl(meth)acrylate, 2-ethylhexyldiglycol(meth)acrylate, butoxyethyl(meth)acrylate, 2-chloroethyl(meth)acrylate, 4-bromobutyl(meth)acrylate, cyanoethyl(meth)acrylate, benzyl(meth)acrylate, butoxymethyl(meth)crylate, 3-methoxybutyl(meth)acrylate, alkoxymethyl(meth)acrylate, alkoxyethyl(meth)acrylate, 2-(2-methoxyethoxy)ethyl(meth)acrylate, 2-(2-butoxyethoxy)ethyl(meth)acrylate, 2,2,2-tetrafluoroethyl(meth)acrylate, 1H,1H,2H,2H-perfluorodecyl(meth)acrylate, 4-butylphenyl(meth)acrylate, phenyl(meth)acrylate, 2,4,5-tetramethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth)acrylate, glycidyloxypropyl(meth)acrylate, tetrahydrofurfuryl(meth)acrylate, hydroxyalkyl(meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, 3-hydroxypropyl(meth)acrylate, dimethylaminoethyl(meth)acrylate, diethylaminoethyl(meth)acrylate, dimethylaminopropyl(meth)acrylate, diethylaminopropyl(meth)acrylate, trimethoxysilylpropyl(meth)acrylate, trimethylsilylpropyl(meth)acrylate, polyethylene oxide monomethyl ether(meth)acrylate, oligoethylene oxide monomethyl ether(meth)acrylate, polyethylene oxide(meth)acrylate, oligoethylene oxide(meth)acrylate, oligoethylene oxide monoalkyl ether(meth)acrylate, polyethylene oxide monoalkyl ether(meth)acrylate, dipropylene glycol(meth)acrylate, polypropylene oxide monoalkyl ether(meth)acrylate, oligopropylene oxide monoalkyl ether(meth)acrylate, 2-methacryloyloxyethyl succinic acid, 2-methacryloyoxy hexahydrophthalic acid, 2-methacryloyloxyethyl-2-hydroxypropyl phthalate, butoxydiethylene glycol(meth)acrylate, trifluoroethyl(meth)acrylate, perfluorooctylethyl(meth)acrylate, 2-hydroxy-3-phenoxypropyl(meth)acrylate, EO-modified phenol(meth)acrylate, EO-modified cresol(meth)acrylate, EO-modified nonylphenol(meth)acrylate, PO-modified nonylphenyl(meth)acrylate, EO-modified-2-ethylhexyl(meth)acrylate, dicyclopentenyl(meth)acrylate, dicyclopentanyl(meth)acrylate and dicyclopentenyloxyethyl(meth)acrylate.

Examples of the polyfunctional (meth)acrylates include difunctional, trifunctional, tetrafunctional, pentafunctional and hexafunctional (meth)acrylates.

Examples of the difunctional (meth)acrylates include 1,6-hexanediol di(meth)acrylate, 1,10-decanediol di(meth)acrylate, neopentylglycol di(meth)acrylate, 2,4-dimethyl-1,5-pentanediol di(meth)acrylate, butylethylpropanediol (meth)acrylate, ethoxylated cyclohexane methanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, hydroxypivalic acid neopentylglycol di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, tricyclodecane di(meth)acrylate, dipropylene glycol di(meth)acrylate, and propoxylated neopentyl glycol di(meth)acrylate.

Examples of the trifunctional (meth)acrylates include trimethylol propane tri(meth)acrylate, trimethylol ethane tri(meth)acrylate, alkylene oxide-modified tri(meth)acrylate of trimethylol propane, pentaerythritol tri(meth)acrylate, dipentaerythritol tri(meth)acrylate, trimethylol propane tri((meth)acryloyloxypropyl)ether, isocyanuric acid alkylene oxide-modified tri(meth)acrylate, propionic acid dipentaerythritol tri(meth)acrylate, tri((meth)acryloyloxyethyl)isocyanurate, hydroxypival aldehyde-modified dimethylol propane tri(meth)acrylate, sorbitol tri(meth)acrylate, propoxylated trimethylol propane tri(meth)acrylate, and ethoxylated glycerin triacrylate.

Examples of the tetrafunctional (meth)acrylates include pentaerythritol tetra(meth)acrylate, sorbitol tetera(meth)acrylate, ditrimethylol propane tetra(meth)acrylate, propionic acid dipentaerythritol tetra(meth)acrylate and ethoxylated pentaerythritol tetra(meth)acrylate.

Examples of the pentafunctional (meth)acrylates include sorbitol penta(meth)acrylate and dipentaerythritol penta(meth)acrylate.

Examples of the hexafunctional (meth)acrylates include dipentaerythritol hexa(meth)acrylate, sorbitol hexa(meth)acrylate, alkylene oxide-modified hexa(meth)acrylate of phosphazene and caprolactone-modified dipentaerythritol hexa(meth)acrylate.

Examples of the (meth)acrylamides include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth)acrylamide, N-isopropyl(meth)acrylamide, N-methylol(meth)acrylamide, N,N-dimethyl(meth)acrylamide, N,N-diethyl(meth)acrylamide and (meth)acryloyl morpholine.

Examples of the aromatic vinyls include styrene, methyl styrene, dimethyl styrene, trimethyl styrene, ethyl styrene, isopropyl styrene, chloromethyl styrene, methoxy styrene, acetoxy styrene, chloro styrene, dichloro styrene, bromo styrene, vinyl benzoic acid methyl ester, 3-methyl styrene, 4-methyl styrene, 3-ethyl styrene, 4-ethyl styrene, 3-propyl styrene, 4-propyl styrene, 3-butyl styrene, 4-butyl styrene, 3-hexyl styrene, 4-hexyl styrene, 3-octyl styrene, 4-octyl styrene, 3-(2-ethylhexyl)styrene, 4-(2-ethylhexyl)styrene, allyl styrene, isopropenyl styrene, butenyl styrene, octenyl styrene, 4-t-butoxycarbonyl styrene, 4-methoxy styrene and 4-t-butoxy styrene.

Examples of the photo radical polymerizable monomers that may be used in the invention further include vinyl esters (such as vinyl acetate, vinyl propionate and vinyl versalate), allyl esters (such as allyl acetate), halogen-containing monomers (such as vinylidene chloride and vinyl chloride), vinyl ethers (such as methyl vinyl ether, butyl vinyl ether, hexyl vinyl ether, methoxy vinyl ether, 2-ethylhexyl vinyl ether, methoxyethyl vinyl ether, cyclohexyl vinyl ether, chloroethyl vinyl ether and triethylene glycol divinyl ether), cyanated vinyls (such as (meth)acrylonitrile), and olefins (such as ethylene and propylene).

Among these compounds, (meth)acrylates and (meth)acrylamides are preferred in view of the curing rate, more preferably 4 or higher-valent (meth)acrylates. Further, in view of the viscosity of the ink composition, it is preferred to use a polyfunctional (meth)acrylate, a monofunctional or difunctioinal (meth)acrylate, and (meth)acrylamide in combination.

Only one kind of (c) polymerizable compound may be used, or two or more kinds thereof may be combined for the purpose of adjusting the reaction rate, physical properties of the ink, or physical properties of the cured film.

Further, (c) polymerizable compound may be either a monofunctional compound or a polyfunctional compound.

In the ink composition according to the invention, the content of (c) polymerizable compound is preferably from 50% by mass to 95% by mass, more preferably from 60% by mass to 92% by mass, particularly preferably from 70% by mass to 90% by mass, from the viewpoint of curability.

<(d) Polymerization Initiator>

The ink composition according to the invention may include (d) polymerization initiator from the viewpoint of improving the curing sensitivity.

The polymerization initiator may be selected according to the type of (c) polymerizable compound, preferably a polymerization initiator for radical polymerization or cationic polymerization, particularly preferably (d-1) photopolymerization initiator.

(d-1) photopolymerization initiator is a compound that allows chemical reaction to occur via action of light or interaction with a sensitizing dye being in an electron excited state, and generates at least one kind of radicals, acid or base as an active species.

The photopolymerization initiator may be appropriately selected from those having sensitivity with respect to ultraviolet rays of 400 to 200 nm, far ultraviolet rays, g-rays, h-rays, i-rays, KrF excimer laser beam, ArF excimer laser beam, electron beam, X-rays, molecular beam or ion beam.

Specific examples of (d-1) photopolymerization initiator include the compounds described in Bruce M. Monroe et al., Chemical Review, 93, 435 (1993), R. S, Davidson, Journal of Photochemistry and biology A: Chemistry, 73.81 (1993), J. P. Faussier, "Photonitiated Polymerization-Theory and Applications": Rapra Review Vol. 9, Report, Rapra Technology (1998), and M. Tsunooka et al., Prog. Polym. Sci., 21,1 (1996). It is also possible to use the compounds used for chemically amplified resists described in "Organic Materials for Imaging", edited by the Japanese Research Association for Organic Electronics Materials, published by Bunshin Design Printing Publishing and Digital Communications (1993), pp. 187-192.

Further, compounds that cause bond cleavage in an acidic or basic manner via interaction with a sensitizing dye being in an electron-excited state are also applicable, such as those described in F. D. Saeva, Topics in Current Chemistry, 156, 59 (1990), G. G. Maslak, Topics in Current Chemistry, 168, 1 (1993), H. B. Shuster et al., JACS, 112, 6329 (1990), and I. D. F. Eaton et al., JACS, 102, 3298 (1980).

When the ink composition according to the invention includes a cationic polymerizable compound, the ink composition includes a polymerization initiator that generates an acid when irradiated with actinic energy rays (radiation). The polymerization initiator used in the invention may be appropriately selected from the compounds that generate acid by irradiating the same with light used for a photo cationic polymerization initiator, a photo quencher of dyes, a photo discoloring agent, or a microresist (ultraviolet rays of 400 to 200 nm, far ultraviolet rays, particularly preferably g-rays, h-rays, i-rays and KrF excimer laser beam), ArF excimer laser beam, electron beam, X-rays, molecular beam, ion beam or the like.

As mentioned above, since ultraviolet irradiation is suitable for the curable composition according to the invention, a polymerization initiator having sensitivity with respect to ultraviolet rays is preferably selected.

Examples of the photo cationic polymerization initiator include compounds that decompose when irradiated with radiation rays and generate acid, such as onium salt compounds including diazonium salts, phosphonium salts, sulfonium salts and iodonium salts, and sultonate compounds such as imide sulfonate, oxime sulfonate, diazodisulfone, disulfone and o-nitrobenzyl sulfonate. The types, specific examples and preferred examples of the photo cationic polymerization initiators that may be used in the polymerizable composition according to the invention include the compounds described in paragraphs [0066] to [0122] of JP-A No. 2008-13646, which are also applicable to the invention.

When the ink composition according to the invention includes a radical polymerizable compound, the ink composition includes a polymerization initiator (also referred to as a photoradical polymerization initiator or a photoradical generator) that generates radicals upon irradiation with actinic energy rays (radiation). Since ultraviolet irradiation is suitable for the curable composition according to the invention, as mentioned above, it is preferred to select a radical polymerization initiator having sensitivity to ultraviolet rays.

In the invention, preferred examples of the radical polymerization initiator include (a) aromatic ketones, (b) onium salt compounds, (c) organic peroxides, (d) thio compounds, (e) hexaaryl biimidazole compounds, (f) ketoxime ester compounds, (g) borate compounds, (h) azinium compounds, (i) metallocene compounds, (j) active ester compounds, (k) compounds having a carbon-halogen bond, and (l) acylphosphine compounds. These radical polymerization initiators may be used alone or in combination of two or more kinds thereof. In the invention, the radical polymerization initiator is preferably used alone or in combination of two or more kinds thereof.

Examples of the compounds mentioned as polymerization initiators (a) to (l) above include the polymerization initiators described in paragraphs [0135] to [0207] of JP-A No. 2006-085049. Polymerization initiators that may be suitably used include those selected from the group consisting of (a) aromatic ketones, (f) ketoxime ester compounds and (l) acylphosphine compounds.

Examples of (a) aromatic ketone compounds include the compounds having a benzophenone skeleton or a thioxanthone skeleton described in pages 77 to 117 of J. P. Fouassier and J. F. Rabek, Radiation Curing in Polymer Science and Technology (1993); α-thiobenzophenone compounds described in Examined Japanese Patent Application Publication No. 47-6416; benzoin ether compounds described in Examined Japanese Patent Application Publication No. 47-3981; α-substituted benzoin compounds described in Examined Japanese Patent Application Publication No. 47-22326; benzoin derivatives described in Examined Japanese Patent Application Publication No. 47-23664; aroyl phosphonates described in JP-A No. 57-30704; dialkoxybenzophenones described in Examined Japanese Patent Application Publication No. 60-26483; benzoin ethers described in JP-A No. 62-81345; α-aminobenzophenones described in Examined Japanese Patent Application Publication No. 1-34242, U.S. Pat. No. 4,318,791 and European Patent Application Publication No. 0284561A1; p-di(dimethylaminobenzoyl)benzenes described in JP-A No. 2-211452; thio-substituted aromatic ketones described in JP-A No. 61-194062; thioxanthones such as Examined Japanese Patent Application Publication No. 63-61950, and coumarins described in Examined Japanese Patent Application Publication No. 59-42864.

Examples of (f) ketoxime ester compounds include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one and 2-ethoxycarbonyloxyimino-1-phenylpropan-1-one. Further examples include the compounds described in JP-A No. 2007-23100, JP-A No. 2007-322744, Japanese National Phase Publication No. 2006-516246, JP-A No. 2001-233842, JP-A No. 2004-534797, JP-A No. 2005-097141, JP-A No. 2006-342166 and the like, and non-patent document Journal of Photochemistry and Photobiology A: 2002, 151, pp. 27-37.

Examples of (1) acylphosphine compounds include acylphosphine sulfides described in Examined Japanese Patent Application Publication No. 2-9597, acylphosphines described in Examined Japanese Patent Application Publication No. 2-9596, monoacylphosphine oxides described in Examined Japanese Patent Application Publication No. 60-8047 and Examined Japanese Patent Application Publication No. 63-40799, bisacylphosphine oxides described in JP-A No. 3-101686, JP-A No. 5-345790 and JP-A No. 6-298818; and acylphosphine oxides described in Examined Japanese Patent Application Publication No. 63-40799, Examined Japanese Patent Application Publication No. 5-29234, JP-A No. 10-95788, JP-A No. 10-29997 and the like. Examples of acylphosphine oxides available as commercial products include IRGACURE series and DAROCURE series, such as IRGACURE 819, IRGACURE 1800, IRGACURE 1870 and DAROCURE TPO (trade name, available from BASF), and these products are also suitably used in the present invention.

(d) photopolymerization initiator may be used alone or in combination of two or more kinds thereof.

The content of (d) photopolymerization initiator in the ink composition according to the invention is preferably from 0.1% by mass to 20% by mass, more preferably from 0.5% by mass to 10% by mass, further preferably from 1% by mass to 7% by mass, with respect to the total mass of the ink composition.

<Other Components>

A further component may be selected and included in the ink composition according to the invention as appropriate according to purposes, in addition to (a) pigment, (b) specific polymer, as well as (c) polymerizable compound and (d) polymerization initiator as optional components.

Examples of the further component include a sensitizing dye, a cosensitizer, a stabilizer, a resin, a surfactant, an ultraviolet absorbent, an antioxidant, a colorfading inhibitor, a discharge stabilizer, an adhesion promoter, a leveling additive and a matte agent. These components may be used alone or in combination of two kinds thereof.

Sensitizing Dye

A sensitizing dye may be added to the ink composition according to the invention in order to improve the sensitivity of the photopolymerization initiator. The sensitizing dye is preferably selected from the following compounds, and has an absorption wavelength in a range of from 350 nm to 450 nm.

Examples of the sensitizing dye include polynucleic aromatics (such as pyrene, perylene, triphenylene and anthracene), xanthenes (such as fluorescein, eosin, erythrosine, Rhodamine B and rose bengal), cyanines (such as thiacarbocyanine and oxacarbocyanine), merocyanines (such as merocyanine and carbomerocyanine), thiazines (such as thionine, methylene blue and toluidine blue), acridines (such as acridine orange, chloroflavin and acriflavin), anthraquinones (such as anthraquinone), squaryliums (such as squarylium) and coumarins (such as 7-diethylamino-4-methylcoumarin).

Preferred examples of the sensitizing dye include the compounds described in paragraphs [0085] to [0098] of JP-A No. 2008-214395 and the following compounds (A-1) to (A-4).

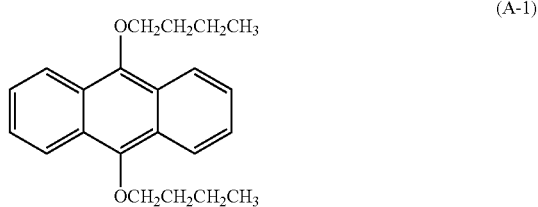

(A-1)

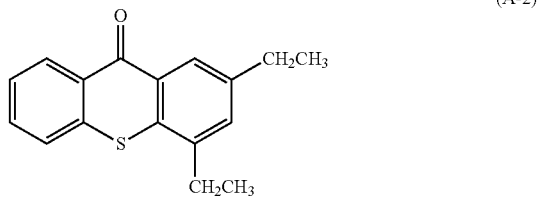

(A-2)

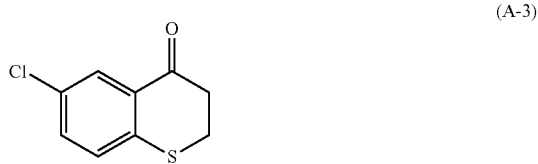

(A-3)

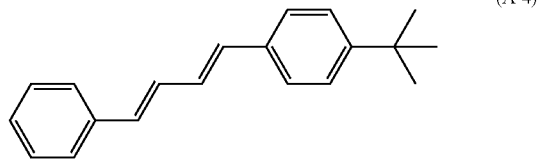

(A-4)

—Cosensitizer—

A known compound having a function of further improving curing sensitivity of the ink composition according to the invention, or suppressing polymerization inhibition due to oxygen, may be added as a cosensitizer to the ink composition according to the invention.

Examples of the cosensitizer include amines such as the compounds described in M. R. Sander et al., Journal of Polymer Society, Vol. 10, p. 3173 (1972), Examined Japanese Patent Application Publication No. 44-20189, JP-A No.

51-82102, JP-A No. 52-134692, JP-A No. 59-138205, JP-A No. 60-84305, JP-A No. 62-18537, JP-A No. 64-33104 and Research Disclosure Vol. 33825. More specific examples include triethanolamino, p-dimethylamino ethyl benzoate, p-formyldimethylaniline and p-methylthiodimethylaniline.

Other cosensitizers include thiols and sulfides, such as the thiol compounds described in JP-A No. 53-702, Examined Japanese Patent Application Publication No. 55-500806 and JP-A No. 5-142772 and the disulfide compounds described in JP-A No. 56-75643. Specific examples include 2-mercaptobenzothiazole, 2-mercaptobenzoxazole, 2-mercaptobenzimidazole, 2-mercapto-4(3H)-quinazoline and β-mercaptonaphthalene.

Yet further cosensitizers include, for example, amino acid compounds (such as N-phenylglycine), organic metal compounds described in Examined Japanese Patent Application Publication No. 48-42965 (such as tributyltin acetate), hydrogen donors described in Examined Japanese Patent Application Publication No. 55-34414, sulfur compounds described in JP-A No. 6-308727 (such as trithian), and phosphorous compounds described in JP-A No. 6-250387 (such as diethyl phosphite).

—Stabilizer—

In the ink composition according to the invention, a stabilizer may be included for the purpose of improving temporal stability. Examples of the stabilizer include, when a cationic polymerizable compound is included, basic compounds such as amine compounds; and when a radical polymerizable compound is included, phenol compounds, nitroxide compounds, hydroquinone compounds and metal-containing compounds. In particular, when the ink composition includes a cationic polymerizable compound, a basic compound may be added for the purpose of suppressing curing of the ink composition inside the head or on the nozzle plate, which may cause discharge defects, in addition to improving the temporal stability. Examples of the basic compound that may be used in the invention include the compounds described in JP-A No. 2003-341217. Hindered amine compounds described in JP-A No. 2008-189776 may be particularly preferably used since these compounds can improve stability while maintaining high sensitivity.

—Resin—

The ink composition according to the invention may include a further resin that is different from (b) specific polymer, for the purpose of adjusting film properties of the recorded image.

Examples of the further resin include acryl-based polymer, polyvinyl butyral resin, polyurethane resin, polyamide resin, polyester resin, epoxy resin, phenol resin, polycarbonate resin, polyvinyl butyral resin, polyvinyl formal resin, shelac, vinyl-based resin, acryl-based resin, rubber-based resin, waxes, and other natural resins. These resins may be used alone or in combination of two or more kinds thereof. Further, in the invention, known waxes may be used instead of a resin.

—Surfactant—

The ink composition according to the invention may include a surfactant for the purpose of adjusting liquid properties of the ink composition.

Examples of the surfactant include nonionic surfactants, cationic surfactants, anionic surfactants and betaine surfactants. Organic fluoro compounds may also be included therein.

—Ultraviolet Absorbent—

The ink composition according to the invention preferably includes an ultraviolet absorbent from the viewpoint of improving weather fastness of the recorded image and suppressing color fading of the same. Further, the ink composition preferably includes an antioxidant from the viewpoint of improving stability of the ink composition, and preferably includes a colorfading inhibitor from the viewpoint of inhibiting color fading of the recorded image (such as organic compounds or metal complex compounds of various kinds). Moreover, when the ink composition is used for inkjet recording, the ink composition preferably includes a discharge stabilizer (such as conductive salts including potassium thiocyanate, lithium nitrate, ammonium thiocyanate and dimethylamine hydrochloride) from the viewpoint of discharge stability, and an adhesion promotor (such as an extremely small amount of organic solvent or a tackifier that does not inhibit the polymerization) from the viewpoint of improving adhesiveness to a recording medium. Additionally, as necessary, a leveling additive or a matte agent may be included in the ink composition.

Ink Composition for Inkjet

One of the preferred embodiments of the ink composition according to the invention is an ink composition for inkjet. The ink composition for inkjet according to the invention can be prepared as an ink composition that is curable with actinic energy rays. In that case, since the ink composition is cured by irradiating with radiation rays after applying the same on a recording medium, the ink composition preferably does not include a solvent, or if it does, the amount of the solvent is preferably extremely small. This is because if the solvent remains in the cured ink image, there is fear that deterioration in solvent resistance, deterioration in blocking properties, defective curing or changes in physical properties of the ink image through time, may be caused due to the remaining solvent. From this point of view, it is preferred to use a polymerizable compound as a dispersing medium, particularly preferably a polymerizable compound having low viscosity, from the viewpoint of improving dispersion suitability, handling ability of the ink composition, or inkjet discharge suitability. Since the ink composition in which the pigment dispersion is included may be cured at high sensitivity by actinic radiation rays, increasing in viscosity due to the lowering in dispersion stability of the pigment, or decreasing the coloring power, may be less likely to occur. Therefore, as mentioned below, the ink composition may be suitably used for an ink for inkjet that is applied to an inkjet recording method in which viscosity stability is required.

<Physical Properties>

—Viscosity—

The viscosity of the ink composition according to the invention is not particularly limited, and may be selected as appropriate according to purposes, but it is preferably from 2 mPa·s to 30 mPa·s, more preferably 20 mPa·s or less, at a temperature at which discharge is performed.

Further, the viscosity of the ink composition according to the invention at room temperature (25° C.) is preferably from 10 mPa·s to 200 mPa·s, more preferably 100 mPa·s or less.

By setting the viscosity at room temperature (25° C.) to a high level, penetration of ink into a recording medium may be suppressed even when the recording medium has a porous structure, the amount of uncured monomers may be reduced, and generation of odor may be suppressed. Moreover, dot bleeding at the time that the ink droplets land may be suppressed. As a result, a high quality image may be obtained.

Further, when the viscosity at room temperature (25° C.) exceeds 200 mPa·s, problems may occur in delivery of the ink composition.

The viscosity may be measured by using a cone-and-plate rotational viscometer (E-type viscometer).

—Surface Tension—

The surface tension of the ink composition according to the invention is not particularly limited, and may be selected as appropriate according to purposes. For example, the surface tension is preferably from 20 mN/m to 30 mN/m, more preferably from 23 mN/m to 28 mN/m.

Further, when the ink composition according to the invention is applied on a recording medium of various kinds, such as polyolefin, PET, coated paper and non-coated paper, the surface tension is preferably 20 mN/m or higher from the viewpoint of suppressing bleeding and penetration, and preferably 30 mN/m or lower from the view point of wetting property.

The surface tension may be measured by, for example, a surface tensiometer employing a Wilhelmy method or a Du Nouy surface tensiometer.

<Preparation of Ink Composition>

The method of preparing the ink composition according to the invention is not particularly limited, and may be selected as appropriate according to purposes. For examples, the ink composition may be produced by mixing the aforementioned components. The mixing may be performed according to a known method using a known mixing apparatus.

<Applications>

The ink composition according to the invention may be suitably used as an ink for recording an image of various kinds When the ink is a curable ink, it is particularly suitable for inkjet printing.

In that case, an image is recorded on a recording medium by using the ink composition according to the invention and an inkjet printer, and then curing the printed ink composition by irradiating the same with actinic radiation rays.

When the ink composition according to the invention is applied to an inkjet method, a high quality image can be directly formed even on a non-absorptive recording medium according to digital data. Therefore, the ink composition according to the invention is also suitably used in the preparation of printed materials having a large area.

Since the printed material obtained by using the ink composition according to the invention has an image portion that is cured by irradiating with actinic radiation rays such as ultraviolet rays, the printed material may exhibit excellent strength. Therefore, the ink composition may be suitably used in various applications other than image recording (image formation), such as formation of an ink receiving layer (image portion) of a planographic printing plate.

For example, since a sharp image with an excellent color forming property can be formed by using the ink composition according to the invention in an ordinary printing method, the ink composition according to the invention may be suitably used not only for obtaining high quality printed materials but also for producing a resist, a color filter, an optical disk or the like, as well as for producing an optical shaping material.

—Inkjet Recording—

In the following, inkjet recording in which the ink composition according to the invention is used is explained.

The method and the conditions for inkjet recording are not particularly limited, and may be selected as appropriate according to purposes. For example, from the viewpoint of achieving excellent discharge stability, the ink composition according to the invention is preferably used by heating the same to a temperature of from 40 to 80° C. and adjusting the viscosity to 30 mPa·s or less, and then discharging the same from an ink nozzle head.

Typically, radiation-curable ink compositions, such as the ink composition according to the invention, exhibit a higher viscosity as compared with ordinary aqueous inks, and exhibit a greater range of change in viscosity caused by changes in temperature during image recording (printing). Since the change in viscosity of the ink composition directly exerts a great influence on the size and the discharge speed of the droplets, it may become a cause of degradation in image quality. Accordingly, it is necessary to keep the temperature of the ink composition as constant as possible during image recording (printing). The width in which the temperature of the ink composition is to be controlled is preferably ±5° C. from the set temperature, more preferably ±2° C. from the set temperatuer, particularly preferably ±1° C. from the set temperature.

The inkjet recording apparatus used for inkjet recording is not particularly limited, and may be selected as appropriate from known apparatuses. Commercially available apparatuses may be suitably used, preferably those having a means for stabilizing the temperature of the ink composition. In that case, portions at which the temperature of the ink composition is to be kept constant preferably include the whole piping system and all the members ranging from the ink tank (when there is an intermediate tank, the intermediate tank) to the nozzle discharge surface.

The method of controlling the temperature of the ink composition is not particularly limited, but it is preferable to provide plural temperature sensors at each piping portion, and control the heating in accordance with the flow rate of the ink composition or the environmental temperature. Further, the ink nozzle head from which the ink composition is discharged is preferably heated. In that case, the ink nozzle head is preferably thermally insulated so that the inkjet recording apparatus itself is not affected by the external temperature. In order to shorten the time for the inkjet recording apparatus (printer) to start up that is necessary for heating, or to reduce the amount of loss of thermal energy, it is preferred to reduce the heat capacity of the whole heating unit, as well as insulating the same from other members.

—Discharge Conditions for Ink Composition—

When the ink composition according to the invention is used for inkjet recording, it is preferred to heat the ink composition so as to keep its temperature constant, and shorten the time period from the discharge of the ink composition to the irradiation with actinic energy rays.

For example, the time period from the discharge of the ink composition to the irradiation with actinic energy rays (hereinafter, also referred to as the time prior to irradiation, sometimes) is preferably from 0.01 to 0.5 seconds, more preferably from 0.01 to 0.3 seconds, particularly preferably from 0.01 to 0.15 seconds.

By controlling the time prior to irradiation within the above range, bleeding of the discharged ink composition before it cures may be effectively suppressed and irradiation with actinic radiation rays may be performed before the ink composition penetrates into a portion that is too deep for light from the light source to reach, even when a porous recording medium is used. Therefore, the amount of remaining unreacted monomers may be suppressed and, as a result, there are advantages of, for example, reducing generation of odor.

By performing discharge under the aforementioned conditions using the ink composition according to the invention, there are advantages in that the dot diameter of the ink composition discharged in droplets may be kept constant and a high quality image may be obtained, even with respect to various kinds of recording media having different surface wetting properties.

Further, in order to obtain a color image, it is preferred to layer the ink compositions having different colors in the order of from lowest to highest in brightness. When ink having low brightness is disposed on an upper position of the layers, it may be difficult for actinic radiation rays to reach the ink of the bottom layer, which may make it easy to inhibit curing sensitivity, increase the amount of remaining monomers, generate odor, deteriorate adhesiveness, or the like. The irradiation with actinic radiation rays may be performed at one time after discharging inks of all colors, but it is preferred to perform irradiation each time the discharge of each color is performed.

As mentioned above, in the ink composition according to the invention, there are advantages in that lowering of dispersibility of the pigment may be effectively suppressed, excellent color forming properties may be achieved over a long term, and lowering of discharge stability due to aggregation of the pigment may be suppressed, even when the ink composition is stored under the temperature conditions in which heating and cooling are repeated, by the action or function of (b) specific polymer.

—Curing—

The ink composition according to the invention is cured upon irradiation with actinic radiation rays after recording an image, and the conditions for irradiation with actinic radiation rays are not particularly limited and may be selected as appropriate according to purposes.

The method of irradiating with actinic radiation rays is described in, for example, JP-A No. 60-132767. In this method, specifically, light sources are provided at both sides of the head unit, and the head and the light sources are moved to scan in a shuttle method. The irradiation with actinic radiation rays is performed after a certain period of time from the landing of ink. Further, curing is completed by using a further light source that is not driven. Moreover, International Publication Pamphlet No. 99/54415 describes as methods for irradiating with actinic radiation rays, methods in which optical fibers are used and methods in which collimated light is applied to a mirror surface provided at the side surface of the head unit to irradiate a recorded portion with UV light. These methods for irradiation are applicable to the invention.

The amount of irradiation with actinic radiation rays may be from 10 to 10,000 $mJ/cm^2$ when ultraviolet rays are used. When the amount of irradiation is within this range, favorable light curability may be achieved.

—Recording Medium—

The recording medium on which an image is recorded by discharging the ink composition according to the invention is not particularly limited, and may be selected as appropriate according to purposes, and the examples thereof include papers such as ordinary non-coated paper and coated paper, non-absorptive resin materials of various kinds that are used for what is called soft packaging, and resin films formed from these non-absorptive resin materials of various kinds Examples of the resin films include a PET film, an OPS film, an OPP film, an ONy film, a PVC film, a PE film, a TAC film, a polycarbonate film, an acrylic film, an ABS film, a polyacetal film, a PVA film and a rubber film. Metals, glass or the like is also applicable as the recording medium.

(Printed Material)

A printed material can be obtained by performing printing on a recording medium using the ink composition according to the invention and an inkjet printer, and subsequently, preferably curing the printed ink composition by irradiating the same with actinic energy rays or by heating the same. Since the printed material produced by using the ink composition according to the invention includes fine particles of the pigment uniformly and stably dispersed therein, it has a high quality image that exhibits an excellent color forming property and sharpness, and the image exhibits excellent weather fastness. Therefore, the printed material is applicable to a wide range of applications.

EXAMPLES

In the following, the invention is explained in more detail with reference to the examples. However, the invention is not limited to these examples.

Synthesis of (b) Specific Polymer

Synthesis of Specific Block Polymer 1 (Including Specific Example M-4)

26.4 g (0.66 mol) of NaOH were added to anhydrous N,N-dimethyl sulfoxide (hereinafter, abbreviated to DMSO) (500 mL), and 100 g (0.51 mol) of 9(10H)-acridanone were added thereto at room temperature. After stirring the mixture for 30 minutes, 85.5 g of chloromethylstyrene were dropped thereto over an hour, and stirred at 60° C. for 12 hours. 200 mL of a mixture of methanol/water=1/1 were added, and the resultant was subjected to filteration, thereby obtaining 102.0 g (0.33 mol, yield: 65%) of a crude product of styrene monomer.

1.43 g of CuBr, 2.6 g of pentamethyldiethylenetriamine (PMDETA), 25.0 g of methyl ethyl ketone (MEK), 0.975 g of ethyl 2-bromo isobutyrate and 7.8 g of styrene monomer obtained by the above process were mixed, and stirred at 65° C. for 30 minutes. Further, a mixed solution of 25 g of methyl methacrylate (MMA) and 25 g of MEK was added, and stirred at 65° C. for 1.5 hours. The catalyst was removed from the obtained reaction solution using an alumina column, and the solvent was removed under reduced pressure. 26.2 g of specific block polymer 1 (target polymer) were thus obtained.

Synthesis of Specific Block Polymer 2 (Including Specific Example M-6)

15.1 g (0.11 mol) of 2-methacryloyloxyethyl isocyanate were dropped to a mixed solution of acetonitrile (120 mL) and 24.1 g (0.11 mol) of 2-aminoanthraquinone, at room temperature. After stirring this mixed solution at room temperature for 7 hours, the solvent was distilled away. 39.0 g (0.10 mol, yield: 91%) of a crude product of monomer (M-6) were thus obtained.

0.72 g of CuBr, 1.3 g of PMDETA, 25.0 g of MEK, 0.49 g of ethyl 2-bromo isobutyrate and 18.9 g of monomer (M-6) were mixed, and stirred at 65° C. for 30 minutes. Further, a mixed solution of 25 g of MMA and 25 g of MEK was added, and stirred at 65° C. for 1.5 hours. The catalyst was removed from the obtained reaction solution using an alumina column, and the solvent was removed under reduced pressure. 27.1 g of specific block polymer 2 (target polymer) were thus obtained.

Synthesis of Specific Block Polymer 3 (Including Specific Example M-9)

26.4 g (0.66 mol) of NaOH were added to anhydrous DMSO (500 mL), and 85.3 g (0.51 mol) of carbazole were added at room temperature. After stirring the mixture for 30 minutes, 85.5 g of chloromethylstyrene were dropped thereto over an hour, and stirred at 60° C. for 12 hours. 200 mL of a mixture of methanol/water=1/1 were added and the resultant was subjected to filtering, thereby obtaining 101.0 g (0.36 mol, yield: 71%) of a crude product of styrene monomer M-9.

1.43 g of CuBr, 2.6 g of PMDETA, 25.0 g of MEK, 0.195 g of ethyl 2-bromo isobutyrate and 7.1 g of styrene monomer M-9 were mixed, and stirred at 65° C. for 30 minutes. Further, a mixed solution of 25 g of MMA and 25 g of MEK was added, and stirred at 65° C. for 1.5 hours. The catalyst was removed from the obtained reaction solution using an alumina column, and the solvent was removed under reduced pressure. 26.5 g of specific block polymer 3 (target polymer) were thus obtained.

Synthesis of Comparative Polymer

—Random Polymer 1—

7.8 g of the styrene monomer described in Synthesis of Specific Block Polymer 1, 25 g of MMA and 50.0 g of MEK were introduced in a nitrogen-substituted three-neck flask and stirred by using a stirrer (THREE-ONE MOTOR (trade name), manufactured by Shinto Scientific Co., Ltd.), and the temperature was raised to 70° C. by heating while allowing nitrogen to flow in the flask. An initiator solution separately prepared from 72 mg of 2,2-azobis(2,4-dimethylvaleronitrile) (trade name: V-65, manufactured by Wako Pure Chemical Industries, Ltd.) and 4.0 g of MEK was dropped over 10 minutes. After the dropping, the mixture was stirred while heating at 70° C. over 2 hours. Subsequently, a further initiator solution of 72 mg of V-65 and 4.0 g of MEK was dropped over 10 minutes, and the mixture was stirred while heating at 70° C. over 4 hours. By subjecting the obtained reaction solution to reprecipitation with 2 L of hexane, 25.3 g of random polymer 1 were obtained.

Preparation of Pigment Dispersion

Example 1

4.0 g of specific block polymer 1 synthesized in the above process was dissolved in 66 g of a polymerizable compound: propoxylated neopentylglycol diacrylate (NPGPODA: manufactured by Sartomer), and this was placed in a motor mill M50 (manufactured by Eiger Machinery, Inc.) together with 30 g of quinacridone pigment (PR122), using zirconia beads having a diameter of 0.65 mm at a circumferential velocity of 9 m/s for 2 hours. Pigment dispersion 1-1 was thus obtained.

Example 2

Pigment dispersion 1-2 was obtained in a similar manner to Example 1, except that specific block polymer 1 was changed to specific block polymer 2.

Example 3

Pigment dispersion 1-3 was obtained in a similar manner to Example 1, except that specific block polymer 1 was changed to specific block polymer 3.

Comparative Example 1

Pigment dispersion 2-1 was obtained in a similar manner to Example 1, except that specific block polymer 1 was changed to random polymer 1 prepared in the synthesis of the comparative polymer.

Comparative Example 2

Pigment dispersion 2-2 was obtained in a similar manner to Example 1, except that specific block polymer 1 was changed to dispersant A (trade name: SOLSPERSE 3200, manufactured by Lubrizol, pigment dispersant). Dispersant A used herein is a polyamine-based graft polymer compound.

Examples 4, 5 and 6 and Comparative Examples 3 and 4

Pigment dispersion 1-4 (Example 4), pigment dispersion 1-5 (Example 5), pigment dispersion 1-6 (Example 6), pigment dispersion 2-3 (Comparative Example 3) and pigment dispersion 2-4 (Comparative Example 4) were prepared in a similar manner to Examples 1, 2 and 3 and Comparative Examples 1 and 2, respectively, except that the quinacridone pigment (PR122) was changed to a condensed azo pigment (PY128).

Examples 7, 8 and 9 and Comparative Examples 5 and 6

Pigment dispersion 1-7 (Example 7), pigment dispersion 1-8 (Example 8), pigment dispersion 1-9 (Example 9), pigment dispersion 2-5 (Comparative Example 5) and pigment dispersion 2-6 (Comparative Example 6) were prepared in a similar manner to Examples 1, 2 and 3 and Comparative Examples 1 and 2, respectively, except that 66.0 g of the polymerizable compound: NPGPODA were changed to 66.0 g of a polymerizable compound: oxetane compound (trade name: OXT-221, manufactured by Toagosei Co., Ltd.)

Examples 10, 11 and 12 and Comparative Examples 7 and 8

Pigment dispersion 1-10 (Example 10), pigment dispersion 1-11 (Example 11), pigment dispersion 1-12 (Example 12), pigment dispersion 2-7 (Comparative Example 7) and pigment dispersion 2-8 (Comparative Example 8) were prepared in a similar manner to Examples 7, 8 and 9 and Comparative Examples 5 and 6, respectively, except that the quinacridone pigment (PR122) was changed to a phthalocyanine pigment (PB15:3).

—Evaluation of Pigment Dispersion—

The obtained pigment dispersions were evaluated in accordance with the following method. The results are shown in Table 1.

<Viscosity of Pigment Dispersion>

The viscosity at 40° C. of the pigment dispersions was measured by using an E-type viscometer. Evaluation of the viscosity was conducted in accordance with the following criteria. Since the viscosity is increased when the pigment forms an aggregation, the pigment dispersibility of a pigment dispersion having a lower viscosity is evaluated as more excellent.

A: less than 300 mPa·s
B: from 300 mPa·s to less than 700 mPa·s
C: 700 mPa·s or greater <Average Particle Diameter>

The volume average particle diameter D50 of the pigment dispersion was measured by using a particle size distribution meter (trade name: LA910, manufactured by Horiba, Ltd.) according to a light-scattering diffraction method. Since the average particle diameter is increased when the pigment forms an aggregation, the pigment dispersibility of a pigment dispersion having a smaller average particle diameter is evaluated as more excellent.

A: D50 is less than 200 nm
B: D50 is from 200 nm to less than 300 nm
C: D50 is 300 nm or greater

TABLE 1

| | Pigment Dispersion No. | Dispersant | Pigment | Evaluation of Pigment Dispersion | |
|---|---|---|---|---|---|
| | | | | Viscosity | Particle Diameter of Pigment |
| Example 1 | 1-1 | Specific Block Polymer 1 | PR122 | A | A |
| Example 2 | 1-2 | Specific Block Polymer 2 | PR122 | A | A |
| Example 3 | 1-3 | Specific Block Polymer 3 | PR122 | A | A |
| Comp. Example 1 | 2-1 | Random Polymer 1 | PR122 | C | B |
| Comp. Example 2 | 2-2 | Dispersant A | PR122 | B | A |
| Example 4 | 1-4 | Specific Block Polymer 1 | PY128 | A | A |
| Example 5 | 1-5 | Specific Block Polymer 2 | PY128 | A | A |
| Example 6 | 1-6 | Specific Block Polymer 3 | PY128 | A | A |
| Comp. Example 3 | 2-3 | Random Polymer 1 | PY128 | C | C |
| Comp. Example 4 | 2-4 | Dispersant A | PY128 | B | B |
| Example 7 | 1-7 | Specific Block Polymer 1 | PR122 | A | A |
| Example 8 | 1-8 | Specific Block Polymer 2 | PR122 | A | A |
| Example 9 | 1-9 | Specific Block Polymer 3 | PR122 | A | A |
| Comp. Example 5 | 2-5 | Random Polymer 1 | PR122 | C | B |
| Comp. Example 6 | 2-6 | Dispersant A | PR122 | B | B |
| Example 10 | 1-10 | Specific Block Polymer 1 | PB15:3 | A | A |
| Example 11 | 1-11 | Specific Block Polymer 2 | PB15:3 | A | A |
| Example 12 | 1-12 | Specific Block Polymer 3 | PB15:3 | A | A |
| Comp. Example 7 | 2-7 | Random Polymer 1 | PB15:3 | C | C |
| Comp. Example 8 | 2-8 | Dispersant A | PB15:3 | B | B |

Pigment dispersions (1-1 to 1-12) of the Examples prepared by using the specific polymer according to the invention (specific block polymers 1 to 3) exhibit a low viscosity of the dispersion and a small particle diameter of the pigment, irrespective of the type of the pigment. These results show that aggregation of the fine pigment particles is suppressed and excellent dispersibility is achieved. On the other hand, pigment dispersions (2-1 to 2-8) of the Comparative Examples, in which the specific polymer according to the invention is not used, exhibit a high viscosity, the measured particle diameter is not sufficiently small, and an aggregation of the pigment is formed. These results show that the pigment dispersion of the Comparative Examples exhibit poor dispersibility of the pigment, as compared with the pigment dispersion of the Examples.

Preparation of Ink Composition for Inkjet

Example 13

The following polymerizable compound and the following polymerization initiator were added to pigment dispersion 1-1 prepared in Example 1, and after mildly mixing the same, the resultant was subjected to pressure filtration using a membrane filter. Curable ink composition for inkjet 1-1' was thus obtained. The amounts of pigment dispersion 1-1, polymerizable compound and polymerization initiator are shown below.

| | |
|---|---|
| Pigment Dispersion 1-1 | 17 g |
| Polymerizable Compounds | |
| (1) Propoxylated neopentylglycol diacrylate (NPGPODA: manufactured by Sartomer) | 19.1 g |
| (2) Dipropylene glycol diacrylate (DPGDA: manufactured by Daicel-Cytec Company, Ltd.) | 30.0 g |
| (3) Phenoxyethyl acrylate (AMP-10G (trade name): manufactured by Shin-Nakamura Chemical Co., Ltd.) | 28.9 g |
| Polymerization initiator: acylphosphine oxide compound (LUCIRIN TPO-L (trade name): manufactured by BASF) | 5.0 g |

Example 14

Curable ink composition for inkjet 1-2' was obtained in a similar manner to Example 13, except that pigment dispersion 1-1 was changed to pigment dispersion 1-2.

Example 15

Curable ink composition for inkjet 1-3' was obtained in a similar manner to Example 13, except that pigment dispersion 1-1 was changed to pigment dispersion 1-3.

Comparative Example 9

Curable ink composition for inkjet 2-1' was obtained in a similar manner to Example 13, except that pigment dispersion 1-1 was changed to pigment dispersion 2-1.

Comparative Example 10

Curable ink composition for inkjet 2-2' was obtained in a similar manner to Example 13, except that pigment dispersion 1-1 was changed to pigment dispersion 2-2.

Examples 16, 17 and 18 and Comparative Examples 11 and 12

Curable ink composition for inkjet 1-4' (Example 16), curable ink composition for inkjet 1-5' (Example 17), curable ink composition for inkjet 1-6' (Example 18), curable ink composition for inkjet 2-3' (Comparative Example 11) and curable ink composition for inkjet 2-4' (Comparative Example 12) were obtained in a similar manner to Examples 13, 14 and 15 and Comparative Examples 9 and 10, respectively, except that the pigment dispersions used therein were changed to pigment dispersions 1-4, 1-5, 1-6, 2-3 and 2-4, respectively.

Specifically, the quinacridone pigment (PR122) used in Examples 13, 14 and 15 and Comparative Examples 9 and 10 was changed to a condensed azo pigment (PY128).

Example 19

The following polymerizable compound and the following polymerization initiator were added to pigment dispersion 1-7 prepared in Example 7, and after mildly mixing the same, the resultant was subjected to pressure filteration using a membrane filter. Curable ink composition for inkjet 1-7' was thus obtained. The amounts of pigment dispersion 1-7, polymerizable compound and polymerization initiator are shown below.

| | |
|---|---|
| Pigment Dispersion 1-7 | 17 g |
| Polymerizable Compounds | |
| (A) Oxetane compound | 59.1 g |
| (OXT-211 (trade name): manufactured by Toagosei Co., Ltd.) | |
| (B) Epoxy compound | 18.9 g |
| (CELOXIDE (trade name): manufactured by Daicel-Cytec Company, Ltd.) | |
| Polymerization initiator: triphenyl sulfonium salt | 5.0 g |
| (UVI-6992 (trade name): manufactured by the Dow Chemical Company) | |

Examples 20 and 21 and Comparative Examples 13 and 14

Curable ink composition for inkjet 1-8' (Example 20), curable ink composition for inkjet 1-9' (Example 21), curable ink composition for inkjet 2-5' (Comparative Example 13) and curable ink composition for inkjet 2-6' (Comparative Example 14) were obtained in a similar manner to Example 19, except that the pigment dispersion used therein were changed to pigment dispersions 1-8, 1-9, 2-5 and 2-6, respectively.

Examples 22, 23, and 24 and Comparative Examples 15 and 16

Curable ink composition for inkjet 1-10' (Example 22), curable ink composition for inkjet 1-11' (Example 23), curable ink composition for inkjet 1-12' (Example 24), curable ink composition for inkjet 2-7' (Comparative Example 15) and curable ink composition for inkjet 2-8' (Comparative Example 16) were obtained in a similar manner to Examples 19, 20 and 21 and Comparative Example 13 and 14, except that the pigment dispersions used therein were changed to pigment dispersions 1-10, 1-11, 1-12, 2-7 and 2-8, respectively.

Specifically, the quinacridone pigment (PR122) used in Examples 19, 20, and 21 and Comparative Examples 13 and 14 was changed to a phthalocyanine pigment (PB15:3).

—Evaluation of Pigment Dispersion—

The obtained ink compositions (curable ink compositions for inkjet) were evaluated in accordance with the following method. The results are shown in Table 2.

<Viscosity of Ink Composition>

The viscosity at 40° C. of each of the ink compositions was measured by using an E-type viscometer. Evaluation of the viscosity was conducted in accordance with the following criteria.

A: less than 30 mPa·s
B: from 30 mPa·s to less than 70 mPa·s
C: 70 mPa·s or greater <Dispersion Stability>

The ink compositions were stored for one month at room temperature (25° C.). Thereafter, dispersion stability of the ink compositions was evaluated based on the results of visual observation and the change in viscosity. Further, dispersion stability of the ink compositions after being stored at 70° C. for 24 hours was evaluated in a similar manner based on the results of visual observation and the change in viscosity. The results are evaluated in accordance with the following criteria.

A: No sedimentation or increase in viscosity is observed.
B: No sedimentation is observed, but a slight increase in viscosity, which is not a problematic level, is observed.
C: No sedimentation is observed, but the viscosity is increased and the discharge ability is lowered to a problematic level for practical applications.
D: Sedimentation is observed at such a level that problems are caused in discharging.

The volume average particle diameter D50 of the ink compositions was measured by using a particle size distribution meter employing a light-scattering diffraction method (trade name: LA910, manufactured by Horiba Ltd.)

A: D50 is less than 200 nm
B: D50 is from 200 nm to less than 300 nm
C: D50 is 300 nm or greater <Curability>

An image was recorded (printed) on art paper using each ink composition and an inkjet printer (print density: 300 dpi (dot per inch), dotting frequency: 4 kHz, number of nozzles: 64), and the recorded image was exposed to ultraviolet rays as actinic radiation rays at an energy of 100 mJ/cm$^2$ by using a deep UV lamp (product number: SP-7, manufactured by Ushio Inc.), thereby obtaining an image recorded material.

The stickiness of the obtained image recorded material by touching the same with a finger is evaluated in accordance with the following criteria.

A: The image recorded material does not feel sticky
B: The image recorded material slightly feels sticky
C: The image recorded material feels sticky to a significant level

TABLE 2

| | | | | Evaluation of Ink Composition | | | | |
|---|---|---|---|---|---|---|---|---|
| | | | | | Stability | | | |
| | Ink Composition No. | Pigment Dispersion No. | Pigment | Viscosity | After Storage at Room Temperature | After Storage at 70° C. | Particle Diameter of Pigment | Curability |
| Example 13 | 1-1' | 1-1 | PR122 | A | A | A | A | A |
| Example 14 | 1-2' | 1-2 | PR122 | A | A | A | A | A |
| Example 15 | 1-3' | 1-3 | PR122 | A | A | B | A | A |
| Comp. Example 9 | 2-1' | 2-1 | PR122 | B | C | C | B | A |
| Comp. Example 10 | 2-2' | 2-2 | PR122 | B | B | C | A | A |
| Example 16 | 1-4' | 1-4 | PY128 | A | A | B | A | A |
| Example 17 | 1-5' | 1-5 | PY128 | A | A | B | A | A |
| Example 18 | 1-6' | 1-6 | PY128 | B | B | B | A | A |

TABLE 2-continued

|  | Ink Composition No. | Pigment Dispersion No. | Pigment | Viscosity | Stability After Storage at Room Temperature | After Storage at 70° C. | Particle Diameter of Pigment | Curability |
|---|---|---|---|---|---|---|---|---|
| Comp. Example 11 | 2-3' | 2-3 | PY128 | C | C | D | C | A |
| Comp. Example 12 | 2-4' | 2-4 | PY128 | B | B | C | B | A |
| Example 19 | 1-7' | 1-7 | PR122 | A | A | A | A | A |
| Example 20 | 1-8' | 1-8 | PR122 | A | A | A | A | A |
| Example 21 | 1-9' | 1-9 | PR122 | B | B | B | A | A |
| Comp. Example 13 | 2-5' | 2-5 | PR122 | C | C | C | C | A |
| Comp. Example 14 | 2-6' | 2-6 | PR122 | B | B | C | B | A |
| Example 22 | 1-10' | 1-10 | PB15:3 | A | A | A | A | A |
| Example 23 | 1-11' | 1-11 | PB15:3 | A | A | A | A | A |
| Example 24 | 1-12' | 1-12 | PB15:3 | A | A | A | A | A |
| Comp. Example 15 | 2-7' | 2-7 | PB15:3 | C | C | C | C | A |
| Comp. Example 16 | 2-8' | 2-8 | PB15:3 | B | B | B | B | A |

As shown in Table 2, the ink compositions of the Examples (1-1' to 1-12') prepared by using a pigment dispersion in which (b) specific polymer according to the invention (specific block polymers 1 to 3) is used exhibit low viscosity and favorable dispersion stability after storing the same at room temperature and at 70° C., as well as a small pigment particle diameter and a favorable curability. On the other hand, the ink compositions of the Comparative Examples (2-1' to 2-8') prepared by using a pigment dispersion in which (b) specific polymer according to the invention is not used exhibit high viscosity and a large particle diameter of the pigment, as well as poor dispersion stability after being stored particularly at 70° C.

As seen in the Examples, the invention can provide a pigment dispersion that exhibits a vivid color tone in which pigment is finely dispersed and the dispersion stability of the pigment is excellent even after being stored for a long term or being stored at high temperature conditions.

Further, the invention can provide an ink composition that exhibits high color purity due to its excellent dispersion stability of the pigment that is maintained even after the long-term storage or the repeated changes in temperature. Moreover, the invention can provide an ink composition that can form a high quality image without causing nozzle clogging even when it is used for inkjet recording.

According to the invention, it is possible to provide a pigment dispersion that includes pigment finely dispersed therein, and exhibits excellent dispersion stability of the pigment after being stored for a long term.

Further, according to the invention, it is possible to provide an ink composition suitable for inkjet recording, the ink composition including pigment finely dispersed therein and exhibiting excellent dispersion stability of the pigment, even after undergoing long-term storage or repeated changes in temperature, thereby maintaining high color purity and suppressed deterioration in dischargeability of the ink through time.

Exemplary embodiments of the present invention include the following embodiments. However, the invention is not limited to the following exemplary embodiments.

<1> A pigment dispersion comprising:
a pigment; and
a block polymer comprising a repeating unit including a hetero ring residue or an anthraquinone ring residue of a colorant.

<2> The pigment dispersion according <1>, wherein the repeating unit is represented by the following Formula (1):

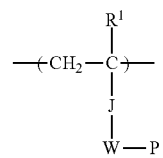

wherein, in Formula (1), $R^1$ represents a hydrogen atom or a methyl group; J represents —CO—, —COO—, —CONR$^2$—, —OCO— or a phenylene group; $R^2$ represents a hydrogen atom, an alkyl group, an aryl group or an arylalkyl group; W represents a single bond or a divalent linking group; and P represents a hetero ring residue including a hetero ring of a colorant or an anthraquinone ring residue including an anthraquinone ring of a colorant.

<3> The pigment dispersion according <2>, wherein in Formula (1), P represents a hetero ring residue formed by removing one hydrogen atom from at least one selected from the group consisting of quinacridone, benzimidazolone, indole, quinoline, carbazole, acridine, acridone and phthalimide or an anthraquinone ring residue formed by removing one hydrogen atom from anthraquinone.

<4> The pigment dispersion according to <2> or <3>, wherein, in Formula (1), J represents —COO— or a phenylene group.

<5> The pigment dispersion according to any one of <1> to <4>, wherein a content of the repeating unit is from 2% by mass to 50% by mass with respect to a total mass of the repeating units plus any other repeating units that are present in the block polymer.

<6> The pigment dispersion according to any one of <1> to <5>, wherein the block polymer comprising a repeating unit including a hetero ring residue or an anthraquinone ring residue of a colorant further comprises a repeating unit derived from a monomer selected from the group consisting of acrylic acid, methacrylic acid, acrylic acid derivatives, methacrylic acid derivatives and styrenes.

<7> The pigment dispersion according to any one of <1> to <6>, wherein the block polymer comprising a repeating unit including a hetero ring residue or an anthraquinone ring residue of a colorant has a weight average molecular weight of from 1,000 to 200,000, and a content of the block polymer in the pigment dispersion is from 2 parts by mass to 100 parts by mass with respect to 100 parts by mass of the pigment.

<8> An ink composition comprising the pigment dispersion of any one of <1> to <7>.

<9> The ink composition of <8>, further comprising a polymerizable compound.

<10> The ink composition of <8> or <9>, further comprising a photopolymerization initiator.

<11> The ink composition of any one of <8> to <10>, wherein a content of the pigment with respect to the ink composition is from 1% by mass to 20% by mass.

<12> The ink composition of any one of <8> to <11>, which is an ink composition for inkjet.

All publications, patent applications, and technical standards mentioned in this specification were herein incorporated by reference to the same extent as if each individual publication, patent application, or technical standard was specifically and individually indicated to be incorporated by reference.

What is claimed is:

1. An ink composition, which is an ink composition for inkjet recording, comprising:
a quinacridone pigment dispersion comprising
a pigment; and
a block polymer comprising a repeating unit including a hetero ring residue or an anthraquinone ring residue of a colorant, wherein the block polymer is an AB block polymer or an ABC block polymer, and the ink composition does not substantially comprise a solvent; wherein the repeating unit is represented by the following Formula (1):

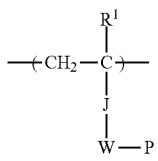

(1)

wherein, in Formula (1), $R^1$ represents a hydrogen atom or a methyl group; J represents —CO—, —COO—, —CONR$^2$—, —OCO— or a phenylene group; $R^2$ represents a hydrogen atom, an alkyl group, an aryl group or an arylalkyl group; W represents a single bond or a divalent linking group;
and P represents a hetero ring residue formed by removing one hydrogen atom from acridone or an anthraquinone ring residue formed by removing a hydrogen atom from anthraquinone.

2. The ink composition according to claim 1, wherein, in Formula (1), J represents —COO— or a phenylene group.

3. The ink composition according to claim 1, wherein a content of the repeating unit is from 2% by mass to 50% by mass with respect to a total mass of the repeating unit plus any other repeating units that are present in the block polymer.

4. The ink composition according to claim 1, wherein the block polymer comprising a repeating unit including a hetero ring residue or an anthraquinone ring residue of a colorant further comprises a repeating unit derived from a monomer selected from the group consisting of acrylic acid, methacrylic acid, acrylic acid derivatives, methacrylic acid derivatives and styrenes.

5. The ink composition according to claim 1, wherein the block polymer comprising a repeating unit including a hetero ring residue or an anthraquinone ring residue of a colorant has a weight average molecular weight of from 1,000 to 200,000, and a content of the block polymer in the pigment dispersion is from 2 parts by mass to 100 parts by mass with respect to 100 parts by mass of the pigment.

6. The ink composition of claim 1, further comprising a polymerizable compound.

7. The ink composition of claim 1, further comprising a photopolymerization initiator.

8. The ink composition of claim 1, wherein a content of the pigment with respect to the ink composition is from 1% by mass to 20% by mass.

9. The ink composition of claim 1, wherein the block polymer is an AB block polymer.

10. The ink composition of claim 1, wherein the block polymer is an AB block polymer comprising the repeating unit represented by Formula (1) and a repeating unit derived from a monomer selected from the group consisting of acrylic acid, methacrylic acid, acrylic acid derivatives, methacrylic acid derivatives and styrenes.

11. The ink composition of claim 1, wherein the block polymer is an AB block polymer comprising the repeating unit represented by Formula (1) and a repeating unit derived from methyl methacrylate.

* * * * *